US 11,835,823 B2

(12) United States Patent
Saitoh et al.

(10) Patent No.: US 11,835,823 B2
(45) Date of Patent: Dec. 5, 2023

(54) TRANSMISSIVE LIQUID CRYSTAL DIFFRACTION ELEMENT

(71) Applicant: FUJIFILM Corporation, Tokyo (JP)

(72) Inventors: Yukito Saitoh, Minamiashigara (JP); Hiroshi Sato, Minamiashigara (JP); Takashi Yonemoto, Minamiashigara (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 18/158,354

(22) Filed: Jan. 23, 2023

(65) Prior Publication Data
US 2023/0161200 A1 May 25, 2023

Related U.S. Application Data

(63) Continuation of application No. PCT/JP2021/025262, filed on Jul. 5, 2021.

(30) Foreign Application Priority Data

Jul. 30, 2020 (JP) ................. 2020-129033

(51) Int. Cl.
G02F 1/1335 (2006.01)
G02F 1/1337 (2006.01)
(Continued)

(52) U.S. Cl.
CPC ...... G02F 1/133757 (2021.01); G02F 1/0045 (2013.01); G02F 1/0063 (2013.01);
(Continued)

(58) Field of Classification Search
CPC ......... G02F 1/133757; G02F 1/133631; G02F 1/0045; G02F 1/0063; G02F 1/133504
(Continued)

(56) References Cited

U.S. PATENT DOCUMENTS 7,732,024 B2 * 6/2010 Mazaki ................ G02B 5/3016
428/1.3
11,480,716 B2 * 10/2022 Saitoh .................. G02B 5/1866
(Continued)

FOREIGN PATENT DOCUMENTS

CN 101978296 A * 2/2011 ................ B44F 1/10
JP 2010-525394 A 7/2010
(Continued)

OTHER PUBLICATIONS

International Preliminary Report on Patentability and Written Opinion of the International Searching Authority (Forms PCT/IB/326, PCT/IB/373, and PCT/ISA/237) for International Application No. PCT/JP2021/025262, dated Feb. 9, 2023, with an English translation.
(Continued)

Primary Examiner — Christopher M Raabe
(74) Attorney, Agent, or Firm — Birch, Stewart, Kolasch & Birch, LLP

(57) ABSTRACT

A transmissive liquid crystal diffraction element includes a rod-like liquid crystal layer where a rod-like liquid crystal compound is aligned and a disk-like liquid crystal layer where a disk-like liquid crystal compound is aligned that are alternately laminated, in which each of the liquid crystal layers has a predetermined liquid crystal alignment pattern, rotation directions of optical axes in the liquid crystal alignment patterns are the same, single periods of the liquid crystal alignment patterns are the same, a thickness direction retardation |Rth| of each of the liquid crystal layers is 65 nm or less, and at an interface between the liquid crystal layers, longitudinal directions of the liquid crystal compounds match with each other.

6 Claims, 6 Drawing Sheets

(51) Int. Cl.
  *G02F 1/13363* (2006.01)
  *G02F 1/00* (2006.01)
(52) U.S. Cl.
  CPC .. *G02F 1/133504* (2013.01); *G02F 1/133631* (2021.01); *G02F 2202/40* (2013.01); *G02F 2203/22* (2013.01); *G02F 2413/08* (2013.01)
(58) Field of Classification Search
  USPC .............................................................. 349/1
  See application file for complete search history.

(56) References Cited

U.S. PATENT DOCUMENTS

| | | | |
|---|---|---|---|
| 2003/0137627 A1* | 7/2003 | Ito | .................... G02F 1/133636 349/117 |
| 2010/0225876 A1 | 9/2010 | Escuti et al. | |
| 2013/0027656 A1 | 1/2013 | Escuti et al. | |
| 2016/0033698 A1 | 2/2016 | Escuti et al. | |
| 2020/0271839 A1 | 8/2020 | Saitoh et al. | |
| 2021/0033764 A1 | 2/2021 | Sato et al. | |
| 2021/0088703 A1 | 3/2021 | Saitoh et al. | |
| 2021/0311352 A1 | 10/2021 | Sasata et al. | |
| 2023/0097214 A1* | 3/2023 | Saitoh | ................... G02B 5/1833 359/483.01 |
| 2023/0244012 A1* | 8/2023 | Yonemoto | ............ G02B 5/3016 349/201 |

FOREIGN PATENT DOCUMENTS

| | | |
|---|---|---|
| JP | 2014-528597 A | 10/2014 |
| JP | 2017-522601 A | 8/2017 |
| WO | WO 2019/093228 A1 | 5/2019 |
| WO | WO 2019/194291 A1 | 10/2019 |
| WO | WO 2019/221294 A1 | 11/2019 |
| WO | WO 2020/122119 A1 | 6/2020 |

OTHER PUBLICATIONS

International Search Report (Form PCT/ISA/210) for International Application No. PCT/JP2021/025262, dated Sep. 7, 2021, with an English translation.
Japanese Notice of Reasons for Refusal for corresponding Japanese Application No. 2022-540107, dated Jun. 27, 2023, with an English translation.

* cited by examiner

TRANSMISSIVE LIQUID CRYSTAL DIFFRACTION ELEMENT

CROSS-REFERENCE TO RELATED APPLICATIONS

This application is a Continuation of PCT International Application No. PCT/JP2021/025262 filed on Jul. 5, 2021, which claims priority under 35 U.S.C. § 119(a) to Japanese Patent Application No. 2020-129033 filed on Jul. 30, 2020. Each of the above application(s) is hereby expressly incorporated by reference, in its entirety, into the present application.

BACKGROUND OF THE INVENTION

1. Field of the Invention

The present invention relates to a transmissive liquid crystal diffraction element that diffracts incident light.

2. Description of the Related Art

As an optical element that bends light to control a traveling direction of the light, a diffraction element is used in many optical devices or systems.

As this diffraction element, a liquid crystal diffraction element formed of a liquid crystal compound is disclosed.

For example, WO2019/221294A describes an optical element comprising an optically-anisotropic layer having a laminated structure in which a first optically-anisotropic layer and a second optically-anisotropic layer are laminated, the first optically-anisotropic layer being a cured layer of a liquid crystal composition including a rod-like liquid crystal compound, and the second optically-anisotropic layer being laminated on the first optically-anisotropic layer and being a cured layer of a liquid crystal composition including a disk-like liquid crystal compound. The first optically-anisotropic layer has a first liquid crystal alignment pattern in which an optical axis of the rod-like liquid crystal compound is parallel to a surface of the first optically-anisotropic layer and is arranged in at least one in-plane direction of the first optically-anisotropic layer, a direction of the optical axis of the rod-like liquid crystal compound continuously rotates and changes, and the direction of the optical axis of the rod-like liquid crystal compound rotates by 180° with a period of 0.5 µm to 5 µm. The second optically-anisotropic layer has a second liquid crystal alignment pattern in which an optical axis of the disk-like liquid crystal compound is parallel to a surface of the second optically-anisotropic layer and is arranged in at least one in-plane direction of the second optically-anisotropic layer, a direction of the disk-like liquid crystal compound continuously rotates and changes, and the direction of the optical axis of the disk-like liquid crystal compound rotates by 180° with a period of 0.5 µm to 5 µm.

SUMMARY OF THE INVENTION

In the diffraction element formed of a liquid crystal compound, diffraction performance such as diffraction efficiency has incidence angle dependence. Therefore, there is a problem in that, as the incidence angle of light increases, the diffraction efficiency decreases.

In addition, the diffraction element formed of a liquid crystal compound has an action of diffracting a circularly polarized light and converting a polarization direction of the circularly polarized light. However, the diffracted light is not likely to be pure circularly polarized light, and the circular polarization degree of the diffracted light is low. Therefore, for applications where the mixing of circularly polarized light components is not desired, there is a problem in that the diffracted light generates noise.

An object of the present invention is to provide a transmissive liquid crystal diffraction element that can maintain a high diffraction efficiency in a wide range of incidence angle and can improve a circular polarization degree of diffracted light.

In order to achieve the object, the present invention has the following configurations.

[1] A transmissive liquid crystal diffraction element comprising:
  a rod-like liquid crystal layer where a rod-like liquid crystal compound is aligned and a disk-like liquid crystal layer where a disk-like liquid crystal compound is aligned that are alternately laminated,
  in which the rod-like liquid crystal layer and the disk-like liquid crystal layer have liquid crystal alignment patterns in which directions in which directions of optical axes derived from the rod-like liquid crystal compound and the disk-like liquid crystal compound change while continuously rotating are parallel to at least one in-plane directions of the rod-like liquid crystal layer and the disk-like liquid crystal layer, respectively,
  a rotation direction of the optical axis in the liquid crystal alignment pattern of the rod-like liquid crystal layer and a rotation direction of the optical axis in the liquid crystal alignment pattern of the disk-like liquid crystal layer are the same,
  in a case where a length over which the direction of the optical axis rotates by 180° in the plane is set as a single period, a single period of the liquid crystal alignment pattern of the rod-like liquid crystal layer and a single period of the liquid crystal alignment pattern of the disk-like liquid crystal layer are the same,
  a thickness direction retardation |Rth| of each of the rod-like liquid crystal layer and the disk-like liquid crystal layer is 65 nm or less, and
  at an interface between the rod-like liquid crystal layer and the disk-like liquid crystal layer, regarding the rod-like liquid crystal compound and the disk-like liquid crystal compound present at the same position in a plane direction of a main surface of the transmissive liquid crystal diffraction element, a longitudinal direction of the rod-like liquid crystal compound and a longitudinal direction of a shape obtained by projecting the disk-like liquid crystal compound to the interface of the disk-like liquid crystal layer match with each other.

[2] The transmissive liquid crystal diffraction element according to [1],
  in which regarding the rod-like liquid crystal compound and the disk-like liquid crystal compound present at the same position in the plane direction of the main surface of the transmissive liquid crystal diffraction element, the longitudinal direction of the rod-like liquid crystal compound and the longitudinal direction of the shape obtained by projecting the disk-like liquid crystal compound to the interface of the disk-like liquid crystal layer match with each other in a range from one surface to another surface of the transmissive liquid crystal diffraction element.

[3] The transmissive liquid crystal diffraction element according to [1],
  in which regarding the rod-like liquid crystal compound and the disk-like liquid crystal compound present at the same position in the plane direction of the main surface of the transmissive liquid crystal diffraction element, in the thickness direction of each of the rod-like liquid crystal layer and the disk-like liquid crystal layer, the longitudinal direction of the rod-like liquid crystal compound and the longitudinal direction of the shape obtained by projecting the disk-like liquid crystal compound to the interface of the disk-like liquid crystal layer are continuously twisted and aligned, and a twisted angle of the twisted alignment in a range from one surface to another surface of the transmissive liquid crystal diffraction element is less than 360°.

[4] The transmissive liquid crystal diffraction element according to any one of [1] to [3], in which each of a thickness of the rod-like liquid crystal layer and a thickness of the disk-like liquid crystal layer is 0.9 µm or less.

According to the present invention, it is possible to provide a transmissive liquid crystal diffraction element that has a high diffraction efficiency in a wide range of incidence angle and can improve a circular polarization degree of diffracted light.

DESCRIPTION OF THE PREFERRED EMBODIMENTS

Hereinafter, a transmissive liquid crystal diffraction element according to an embodiment of the present invention will be described in detail based on a preferred embodiment shown in the accompanying drawings.

In the present specification, numerical ranges represented by "to" include numerical values before and after "to" as lower limit values and upper limit values.

In the present specification, "(meth)acrylate" represents "either or both of acrylate and methacrylate".

In the present specification, the meaning of "the same" and "equal" includes a case where an error range is generally allowable in the technical field.

[Transmissive Liquid Crystal Diffraction Element]

A transmissive liquid crystal diffraction element according to an embodiment of the present invention comprises:

a rod-like liquid crystal layer where a rod-like liquid crystal compound is aligned and a disk-like liquid crystal layer where a disk-like liquid crystal compound is aligned that are alternately laminated, wherein the rod-like liquid crystal layer and the disk-like liquid crystal layer have liquid crystal alignment patterns in which directions in which directions of optical axes derived from the liquid crystal compounds changes while continuously rotating are parallel to at least one in-plane directions of the rod-like liquid crystal layer and the disk-like liquid crystal layer, respectively, a rotation direction of the optical axis in the liquid crystal alignment pattern of the rod-like liquid crystal layer and a rotation direction of the optical axis in the liquid crystal alignment pattern of the disk-like liquid crystal layer are the same, in a case where a length over which the direction of the optical axis rotates by 180° in the plane is set as a single period, a single period of the liquid crystal alignment pattern of the rod-like liquid crystal layer and a single period of the liquid crystal alignment pattern of the disk-like liquid crystal layer are the same, a thickness direction retardation |Rth| of each of the rod-like liquid crystal layer and the disk-like liquid crystal layer is 65 nm or less, and at an interface between the rod-like liquid crystal layer and the disk-like liquid crystal layer, regarding the rod-like liquid crystal compound and the disk-like liquid crystal compound present at the same position in a plane direction of a main surface of the transmissive liquid crystal diffraction element, a longitudinal direction of the rod-like liquid crystal compound and a longitudinal direction of a shape obtained by projecting the disk-like liquid crystal compound to the interface of the disk-like liquid crystal layer match with each other.

Figure 1:
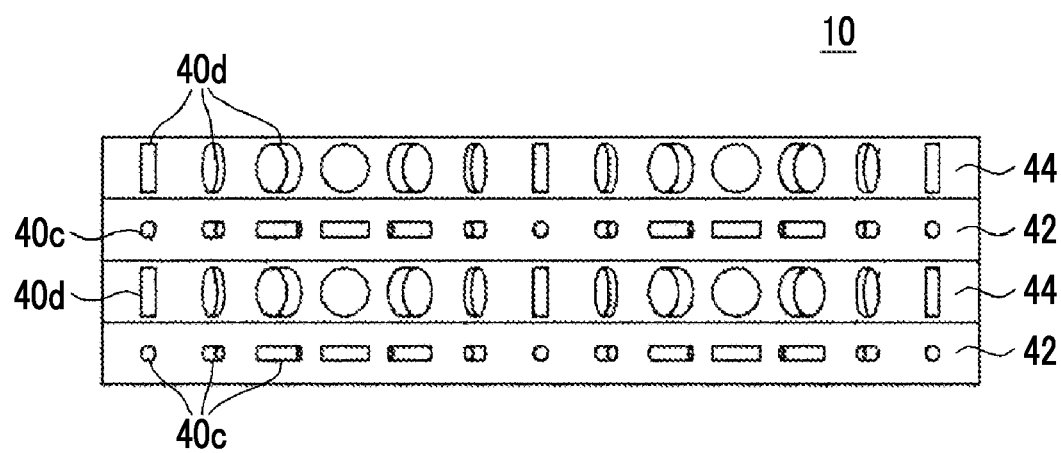
FIG. 1 is a diagram conceptually showing an example of a transmissive liquid crystal diffraction element according to the present invention.

FIG. 1 conceptually shows an example of the transmissive liquid crystal diffraction element according to the embodiment of the present invention.

A transmissive liquid crystal diffraction element 10 shown in FIG. 1 includes four layers in total including a rod-like liquid crystal layer 42 and a disk-like liquid crystal layer 44 that are alternately laminated in a thickness direction. In FIG. 1, in order to simplify the drawing to clarify a configuration of the transmissive liquid crystal diffraction element 10, only the liquid crystal compounds (liquid crystal compound molecules) on the surfaces of the rod-like liquid crystal layer 42 and the disk-like liquid crystal layer 44 are conceptually shown. However, as conceptually shown in FIGS. 4 and 6, each of the rod-like liquid crystal layer 42 and the disk-like liquid crystal layer 44 has a structure in which the liquid crystal compound is laminated in the thickness direction. In the following description, in a case where it is not necessary to distinguish between the rod-like liquid crystal compound and the disk-like liquid crystal compound, the rod-like liquid crystal compound and the disk-like liquid crystal compound will also be simply referred to as the liquid crystal compound.

As shown in FIG. 1, the rod-like liquid crystal layer 42 and the disk-like liquid crystal layer 44 are alternately laminated in the thickness direction.

The rod-like liquid crystal layer 42 is a layer where the rod-like liquid crystal compound 40c is aligned in the liquid crystal alignment pattern where the direction in which the direction of the optical axis changes while continuously rotating is parallel to at least one in-plane direction. In addition, the disk-like liquid crystal layer 44 is a layer where the disk-like liquid crystal compound 40d is aligned in the liquid crystal alignment pattern where the direction in which the direction of the optical axis changes while continuously rotating is parallel to at least one in-plane direction.

In addition, in the example shown in FIG. 1, the rod-like liquid crystal compound 40c and the disk-like liquid crystal compound 40d present at the same position in a plane direction of a main surface of the transmissive liquid crystal diffraction element 10 are aligned such that, at least at an interface between the rod-like liquid crystal layer and the disk-like liquid crystal layer, a longitudinal direction of the rod-like liquid crystal compound 40c and a longitudinal direction of a shape obtained by projecting the disk-like liquid crystal compound 40d to the interface of the disk-like liquid crystal layer 44 (hereinafter, simply referred to as the longitudinal direction of the disk-like liquid crystal compound 40d) match with each other.

Although described below in detail, in a case where the liquid crystal layer formed of the liquid crystal compound has the liquid crystal alignment pattern in which the direction in which the direction of the optical axis derived from the liquid crystal compound changes while continuously rotating is parallel to at least one in-plane direction, transmitted light can be diffracted. In this case, in a case where a length over which the direction of the optical axis derived from the liquid crystal compound in the liquid crystal alignment pattern rotates by 180° in a plane is set as a single period, (hereinafter, also referred to as the single period of the liquid crystal alignment pattern), the diffraction angle depends on the length of the single period. Therefore, the diffraction angle can be adjusted by adjusting the single period of the liquid crystal alignment pattern. In addition, in this case, the diffraction direction depends on the rotation direction of the optical axis in the liquid crystal alignment pattern. Therefore, the diffraction direction can be adjusted by adjusting the rotation direction of the optical axis in the liquid crystal alignment pattern.

Here, in the present invention, a rotation direction of the optical axis in the liquid crystal alignment pattern of the rod-like liquid crystal layer 42 and a rotation direction of the optical axis in the liquid crystal alignment pattern of the disk-like liquid crystal layer 44 are the same, and the length of a single period of the liquid crystal alignment pattern of the rod-like liquid crystal layer 42 and the length of a single period of the liquid crystal alignment pattern of the disk-like liquid crystal layer 44 are the same. In addition, at least at an interface between the rod-like liquid crystal layer 42 and the disk-like liquid crystal layer 44, regarding the rod-like liquid crystal compound 40c and the disk-like liquid crystal compound 40d present at the same position in a plane direction of a main surface of the transmissive liquid crystal diffraction element, a longitudinal direction of the rod-like liquid crystal compound 40c and a longitudinal direction of a shape obtained by projecting the disk-like liquid crystal compound 40d to the interface of the disk-like liquid crystal layer 44 match with each other. In the present invention, the single periods and the rotation directions of the liquid crystal alignment patterns of the rod-like liquid crystal layer 42 and the disk-like liquid crystal layer 44 that are alternately laminated are the same. Therefore, the rod-like liquid crystal layer 42 and the disk-like liquid crystal layer 44 that are alternately laminated integrally exhibit an optical action as one liquid crystal layer (optically-anisotropic layer) having a predetermined liquid crystal alignment pattern. Further, a thickness direction retardation |Rth| of each of the rod-like liquid crystal layer 42 and the disk-like liquid crystal layer 44 is 65 nm or less. That is, in the structure where the rod-like liquid crystal layer 42 and the disk-like liquid crystal layer 44 are alternately laminated, the absolute value of the highest Rth among the Rth values of the layers is 65 nm or less at a maximum.

As described above, in the diffraction element formed of a liquid crystal compound, diffraction performance such as diffraction efficiency has incidence angle dependence. Therefore, there is a problem in that, as an incidence angle of light increases, the diffraction efficiency decreases. Specifically, for example, in the case of a single liquid crystal layer where the rod-like liquid crystal compound is aligned in a predetermined liquid crystal alignment pattern, in a case where the liquid crystal layer is seen from a direction perpendicular to a surface of the liquid crystal layer, a difference between the length in the longitudinal direction and the length in the lateral direction of the rod-like liquid crystal compound is the same without depending on the direction of the rod-like liquid crystal compound. Therefore, the in-plane retardation Re is fixed without depending on the position in the plane direction of the liquid crystal layer. On the other hand, in a case where the liquid crystal layer is seen from a direction oblique to a surface of the liquid crystal layer, a difference between the length in the longitudinal direction and the length in the lateral direction of the rod-like liquid crystal compound varies depending on the direction of the rod-like liquid crystal compound. Therefore, the in-plane retardation Re varies depending on the position in the plane direction of the liquid crystal layer. Accordingly, in a case where light incident in the direction oblique to the surface of the liquid crystal layer, the optical action of the liquid crystal layer is different from that in a case where light incident in the direction perpendicular to the surface of the liquid crystal layer, and the diffraction efficiency decreases. This point can also be applied to the case of a single liquid crystal layer where the disk-like liquid crystal compound-like liquid crystal compound is aligned in a predetermined liquid crystal alignment pattern. This way, the in-plane retardation Re changes depending on the incidence angle of light in a case where the thickness direction retardation Rth of the liquid crystal layer is not zero.

In addition, although described below in detail, the liquid crystal diffraction element using liquid crystal formed of liquid crystal converts a polarization direction of incident circularly polarized light into the opposite direction. Here, in a case where the thickness direction retardation Rth of the liquid crystal diffraction element is not zero, as light propagates while changing a direction in the liquid crystal diffraction element, the in-plane retardation Re on the light changes. Therefore, circularly polarized light that is diffracted by the liquid crystal diffraction element is not complete circularly polarized light. Therefore, in applications where the mixing of right circularly polarized light and left circularly polarized light is not desired, there is a problem in that the diffracted light generates noise.

On the other hand, the transmissive liquid crystal diffraction element according to the embodiment of the present invention has the configuration in which the rod-like liquid crystal layer 42 and the disk-like liquid crystal layer 44 having the same single period and the rotation direction of the liquid crystal alignment pattern are alternately laminated. Here, the rod-like liquid crystal compound 40c has positive birefringence, and the disk-like liquid crystal compound 40d has negative birefringence. Therefore, by alternately laminating the rod-like liquid crystal layer 42 and the disk-like liquid crystal layer 44, the thickness direction retardation Rth of the single liquid crystal layer where the rod-like liquid crystal layer 42 and the disk-like liquid crystal layer 44 are alternately laminated can be approximated to zero. In this case, by adjusting the materials, thicknesses, and the like of the rod-like liquid crystal layer 42 and the disk-like liquid crystal layer 44, the thickness direction retardation |Rth| of each of the rod-like liquid crystal layer 42 and the disk-like liquid crystal layer 44 is adjusted to be 65 nm or less. As a result, a change in in-plane retardation Re depending on the incidence angle of light can be suppressed. Therefore, in a case where light is incident into the transmissive liquid crystal diffraction element including this liquid crystal layer from an oblique direction, a change in in-plane retardation Re depending on the incidence angle can be reduced. Therefore, the incidence angle dependence of the diffraction efficiency can be reduced.

In addition, in the transmissive liquid crystal diffraction element according to the embodiment of the present invention, by alternately laminating the rod-like liquid crystal layer 42 and the disk-like liquid crystal layer 44, the thickness direction retardation Rth can be approximated to zero. Therefore, even when light propagates while changing a direction in the liquid crystal diffraction element, the retardation on the light is reduced. Therefore, circularly polarized light that is diffracted by the transmissive liquid crystal diffraction element is converted into complete circularly polarized light. Therefore, in applications where the mixing of right circularly polarized light and left circularly polarized light is not desired, the transmissive liquid crystal diffraction element can be preferably used.

Here, regarding the thickness of the rod-like liquid crystal layer 42 and the thickness of the disk-like liquid crystal layer 44, it is preferable that the total thickness of the rod-like liquid crystal layer 42 and the disk-like liquid crystal layer 44 is not excessively large with respect to the wavelength of light to be incident. In a case where the thickness of the rod-like liquid crystal layer 42 and the thickness of disk-like liquid crystal layer 44 are sufficiently large with respect to the wavelength of light to be incident, each of the layers exhibits an optical action (retardation) on light as a single layer. In this case, as in the case of the above-described single layer, the retardation changes depending on the incidence angle of light. Therefore, in a case where the incidence angle is large, the diffraction efficiency decreases.

From the above-described viewpoint, each of the thickness of the rod-like liquid crystal layer 42 and the thickness of the disk-like liquid crystal layer 44 may be appropriately adjusted depending on the wavelength of light to be diffracted. In a case where the light to be diffracted is visible light, the thickness is preferably 0.9 µm or less, more preferably 0.7 µm to 0.01, and still more preferably 0.5 µm to 0.01 µm.

In a state where the rod-like liquid crystal layer 42 and the disk-like liquid crystal layer 44 are laminated, the thickness direction retardation |Rth| of each of the layers is measured as follows.

The film thickness of each of the layers can be obtained using a cross-sectional SEM. In addition, by retardation measurement in which a cross-sectional specimen of the transmissive liquid crystal diffraction element is cut, a slow axis direction and a fast axis direction of each of the liquid crystal layers and a difference in refractive index therebetween can be obtained from a cross-sectional direction of the transmissive liquid crystal diffraction element. As a result, Rth in each of the layers can be obtained.

Here, in the example shown in FIG. 1, the four layers in total where two rod-like liquid crystal layers 42 and two disk-like liquid crystal layers 44 are laminated are provided. However, the present invention is not limited to this example. A configuration where two layers in total including one rod-like liquid crystal layer 42 and one disk-like liquid crystal layer 44 are provided may be adopted, a configuration where three layers in total including two rod-like liquid crystal layers 42 and one disk-like liquid crystal layer 44 or including one rod-like liquid crystal layer 42 and two disk-like liquid crystal layer 44 are provided may be adopted, or a configuration where five layers in total including the rod-like liquid crystal layers 42 and the disk-like liquid crystal layers 44 may be adopted.

That is, the present invention is not limited to the configuration where the numbers of the rod-like liquid crystal layers 42 and the disk-like liquid crystal layers 44 are the same, and the number of any one of the rod-like liquid crystal layers 42 or the disk-like liquid crystal layers 44 may be one more than the number of the other one.

Here, in the example shown in FIG. 1, regarding the rod-like liquid crystal compound 40c and the disk-like liquid crystal compound 40d present at the same position in the plane direction of the main surface of the transmissive liquid crystal diffraction element 10, the longitudinal direction of the rod-like liquid crystal compound 40c and the longitudinal direction of the disk-like liquid crystal compound 40d match with each other in a range from one surface (for example, a surface that is exposed without the disk-like liquid crystal layer 44 being laminated among the surfaces of the rod-like liquid crystal layer 42) to another surface (for example, a surface that is exposed without the rod-like liquid crystal layer 42 being laminated among the surfaces of the disk-like liquid crystal layer 44) of the transmissive liquid crystal diffraction element 10. However, the present invention is not limited to this example as long as the longitudinal directions of the liquid crystal compounds match with each other at the interface between the rod-like liquid crystal layer and the disk-like liquid crystal layer.

Figure 2:
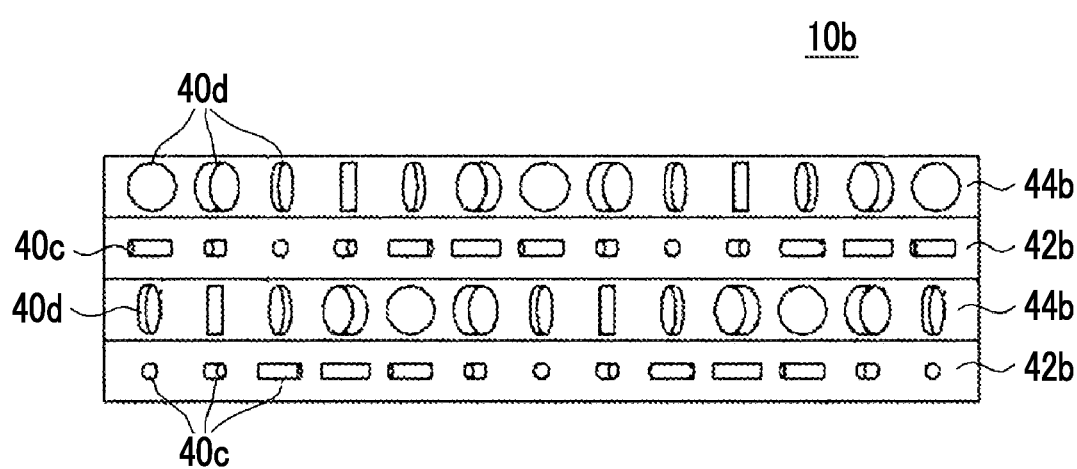
FIG. 2 is a diagram conceptually showing a rod-like liquid crystal layer in the transmissive liquid crystal diffraction element shown in FIG. 1.

FIG. 2 shows another example of the transmissive liquid crystal diffraction element according to the embodiment of the present invention.

A transmissive liquid crystal diffraction element 10b shown in FIG. 2 includes four layers in total including a rod-like liquid crystal layer 42b and a disk-like liquid crystal layer 44b that are alternately laminated in a thickness direction. In FIG. 2, in order to simplify the drawing to clarify a configuration of the transmissive liquid crystal diffraction element 10b, only the liquid crystal compounds on the surfaces of the rod-like liquid crystal layer 42b and the disk-like liquid crystal layer 44b are conceptually shown. However, the rod-like liquid crystal layer 42b and the disk-like liquid crystal layer 44b have a structure in which the liquid crystal compound is laminated in the thickness direction.

The rod-like liquid crystal layer 42b is a layer where the rod-like liquid crystal compound 40c is aligned in the liquid crystal alignment pattern where the direction in which the direction of the optical axis changes while continuously rotating is parallel to at least one in-plane direction. In addition, the disk-like liquid crystal layer 44b is a layer where the disk-like liquid crystal compound 40d is aligned in the liquid crystal alignment pattern where the direction in which the direction of the optical axis changes while continuously rotating is parallel to at least one in-plane direction. In addition, a rotation direction of the optical axis in the liquid crystal alignment pattern of the rod-like liquid crystal layer 42*b* and a rotation direction of the optical axis in the liquid crystal alignment pattern of the disk-like liquid crystal layer 44*b* are the same, and the length of a single period of the liquid crystal alignment pattern of the rod-like liquid crystal layer 42*b* and the length of a single period of the liquid crystal alignment pattern of the disk-like liquid crystal layer 44*b* are the same. In addition, at an interface between the rod-like liquid crystal layer 42*b* and the disk-like liquid crystal layer 44*b*, regarding the rod-like liquid crystal compound 40*c* and the disk-like liquid crystal compound 40*d* present at the same position in a plane direction of a main surface of the transmissive liquid crystal diffraction element 10*b*, a longitudinal direction of the rod-like liquid crystal compound 40*c* and a longitudinal direction of a shape obtained by projecting the disk-like liquid crystal compound 40*d* to the interface of the disk-like liquid crystal layer 44*b* match with each other. In addition, a thickness direction retardation |Rth| of each of the rod-like liquid crystal layer 42*b* and the disk-like liquid crystal layer 44*b* is 65 nm or less.

Here, in the example shown in FIG. 2, the longitudinal directions of the liquid crystal compounds in a plane are integrally twisted and aligned in the thickness direction from the rod-like liquid crystal layer 42*b* on the lower side in the drawing to the disk-like liquid crystal layer 44*b* on the upper side in the drawing. As a result, the two rod-like liquid crystal layers 42*b* and the two disk-like liquid crystal layers 44*b* as one liquid crystal layer have a configuration where the liquid crystal compounds are twisted and aligned in the thickness direction.

In the example shown in FIG. 2, a twisted direction of the liquid crystal compound in the transmissive liquid crystal diffraction element 10*b* is a counterclockwise rotation direction from the upper side to the lower side in the drawing. In the twisted alignment of the transmissive liquid crystal diffraction element 10*b*, a twisted angle in the thickness direction is less than 360°. That is, in a range from one surface (for example, a surface that is exposed without the disk-like liquid crystal layer 44*b* being laminated among the surfaces of the rod-like liquid crystal layer 42*b*) to another surface (for example, a surface that is exposed without the rod-like liquid crystal layer 42*b* being laminated among the surfaces of the disk-like liquid crystal layer 44*b*) of the transmissive liquid crystal diffraction element 10*b*, the twisted angle of the twisted alignment is less than 360°, and the liquid crystal compound is twisted and aligned to the degree to which it is not cholesterically aligned.

This way, in a case where the transmissive liquid crystal diffraction element 10*b* has the structure in which the liquid crystal compound is twisted and aligned in the thickness direction, in a case where an incidence angle and an emission angle of light with respect to the transmissive liquid crystal diffraction element 10 are different, the diffraction efficiency can be improved. Specifically, in a cross-section parallel to the direction (arrangement axis D direction described below) in which the direction of the optical axis changes while continuously rotating, it is preferable that an angle of an incidence direction of light and an angle of an emission direction of light with respect to a line segment obtained by connecting the liquid crystal compounds facing the same direction to each other in the thickness direction are the same.

In addition, a configuration may be adopted in which two optically-anisotropic layers shown in FIG. 2 where the rod-like liquid crystal layer and the disk-like liquid crystal layer are laminated and the longitudinal directions of the liquid crystal compounds are twisted and aligned and twisted directions of the two optically-anisotropic layers are opposite to each other.

Figure 3:
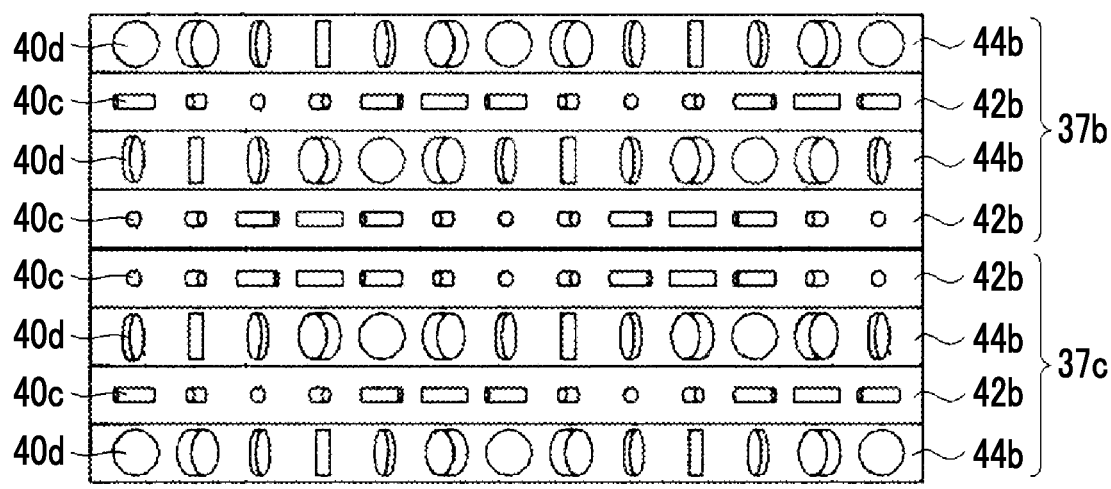
FIG. 3 is a front view showing the rod-like liquid crystal layer shown in FIG. 2.

FIG. 3 is a diagram conceptually showing another example of the transmissive liquid crystal diffraction element according to the embodiment of the present invention.

A transmissive liquid crystal diffraction element 10*c* shown in FIG. 3 includes: a first optically-anisotropic layer 37*b* including four layers in total in which the rod-like liquid crystal layer 42*b* and the disk-like liquid crystal layer 44*b* are alternately laminated; and a second optically-anisotropic layer 37*c* including four layers in total in which the rod-like liquid crystal layer 42*b* and the disk-like liquid crystal layer 44*b* are alternately laminated.

The rod-like liquid crystal layer 42*b* is a layer where the rod-like liquid crystal compound 40*c* is aligned in the liquid crystal alignment pattern where the direction in which the direction of the optical axis changes while continuously rotating is parallel to at least one in-plane direction. In addition, the disk-like liquid crystal layer 44*b* is a layer where the disk-like liquid crystal compound 40*d* is aligned in the liquid crystal alignment pattern where the direction in which the direction of the optical axis changes while continuously rotating is parallel to at least one in-plane direction.

In addition, a rotation direction of the optical axis in the liquid crystal alignment pattern of the rod-like liquid crystal layer 42*b* and a rotation direction of the optical axis in the liquid crystal alignment pattern of the disk-like liquid crystal layer 44*b* are the same, and the length of a single period of the liquid crystal alignment pattern of the rod-like liquid crystal layer 42*b* and the length of a single period of the liquid crystal alignment pattern of the disk-like liquid crystal layer 44*b* are the same. That is, the rotation directions and the lengths of the single periods of the optical axes in the liquid crystal alignment patterns of the rod-like liquid crystal layer 42*b* and the disk-like liquid crystal layer 44*b* of the first optically-anisotropic layer 37*b* are the same as the rotation directions and the lengths of the single periods of the optical axes in the liquid crystal alignment patterns of the rod-like liquid crystal layer 42*b* and the disk-like liquid crystal layer 44*b* of the second optically-anisotropic layer 37*c*. In addition, in each of the first optically-anisotropic layer 37*b* and the second optically-anisotropic layer 37*c*, a thickness direction retardation|Rth| of each of the rod-like liquid crystal layer 42*b* and the disk-like liquid crystal layer 44*b* is 65 nm or less.

Here, in the example shown in FIG. 3, in the first optically-anisotropic layer 37*b*, the longitudinal directions of the liquid crystal compounds in a plane are integrally twisted and aligned in the thickness direction from the rod-like liquid crystal layer 42*b* on the lower side (side in contact with the second optically-anisotropic layer 37*c*) in the drawing to the disk-like liquid crystal layer 44*b* on the upper side in the drawing. Specifically, the twisted direction of the liquid crystal compound in the first optically-anisotropic layer 37*b* is a counterclockwise rotation direction from the upper side to the lower side in the drawing. On the other hand, in the second optically-anisotropic layer 37*c*, the longitudinal directions of the liquid crystal compounds in a plane are integrally twisted and aligned in the thickness direction from the disk-like liquid crystal layer 44*b* on the lower side in the drawing to the rod-like liquid crystal layer 42*b* on the upper side (side in contact with the first optically-anisotropic layer 37*b*) in the drawing. Specifically, a twisted direction of the liquid crystal compound in the second optically-anisotropic layer 37*c* is a clockwise rotation direction from the upper side to the lower side in the drawing. That is, the twisted direction of the liquid crystal compound in the first optically-anisotropic layer 37b and the twisted direction of the liquid crystal compound in the second optically-anisotropic layer 37c are opposite to each other.

This way, by adopting the configuration where the transmissive liquid crystal diffraction element 10c includes the optically-anisotropic layers where the twisted directions of the liquid crystal compounds in the thickness direction are different, the angle dependence and the wavelength dependence of the diffraction efficiency are further improved. In this case, the optimum values of the twisted angle (the total twisted angle in the thickness direction) and the retardation $\Delta n \times d$ of each of the optically-anisotropic layers change depending on the difference $\Delta n$ in refractive index of the liquid crystal compound. Therefore, the twisted angle may be optimized for each of the optically-anisotropic layers. The twisted angle is preferably 30° to 180°. The twisted alignment can be realized by adding a chiral agent that is typically used.

In addition, in a case where $\Delta n$ of the liquid crystal compound is large, the angle dependence and the wavelength dependence are further improved, which is preferable.

In addition, in the example shown in FIG. 3, the transmissive liquid crystal diffraction element 10c has the two-layer configuration in which the optically-anisotropic layers having different twisted directions are laminated. However, the present invention is not limited to this configuration. The transmissive liquid crystal diffraction element may include three optically-anisotropic layers having different twisted directions. Alternatively, the transmissive liquid crystal diffraction element may include an optically-anisotropic layer where the liquid crystal compound is not twisted in the thickness direction that is provided between two optically-anisotropic layers having different twisted directions. As a result, the angle dependence and the wavelength dependence of the diffraction efficiency are further improved.

In the optically-anisotropic layer where the liquid crystal compound is not twisted and aligned between the optically-anisotropic layers where the liquid crystal compound is twisted and aligned, it is preferable that, in any position in the plane direction of the main surface of the transmissive liquid crystal diffraction element, the direction of the optical axis of the liquid crystal compound is continuously connected (directed to the same direction) to the direction of the optical axis of the liquid crystal compound at an interface with the adjacent optically-anisotropic layer where the liquid crystal compound is twisted and aligned. The configuration where the directions of the optical axes of the liquid crystal compounds are connected between the adjacent optically-anisotropic layers can be achieved by laminating and applying the upper liquid crystal layer to the lower liquid crystal layer.

In a case where the transmissive liquid crystal diffraction element includes the optically-anisotropic layers where the twisted directions of the liquid crystal compounds in the thickness direction are different, the twisted angles per unit length in the thickness direction of the optically-anisotropic layers may be the same as or different from each other.

Hereinafter, the rod-like liquid crystal layer 42 will be described using FIGS. 4 and 5.

Figure 4:
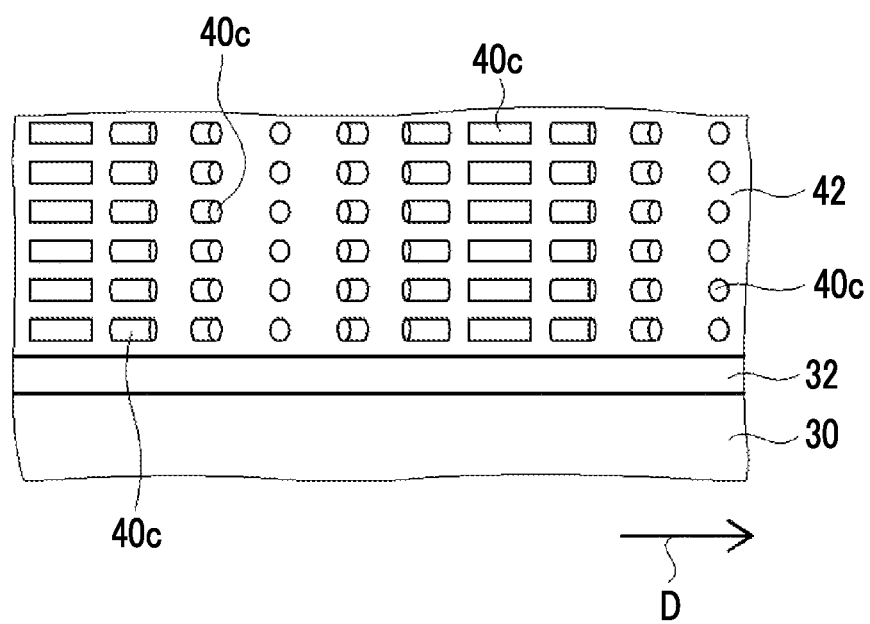
FIG. 4 is a diagram conceptually showing a disk-like liquid crystal layer in the transmissive liquid crystal diffraction element shown in FIG. 1.
Figure 5:
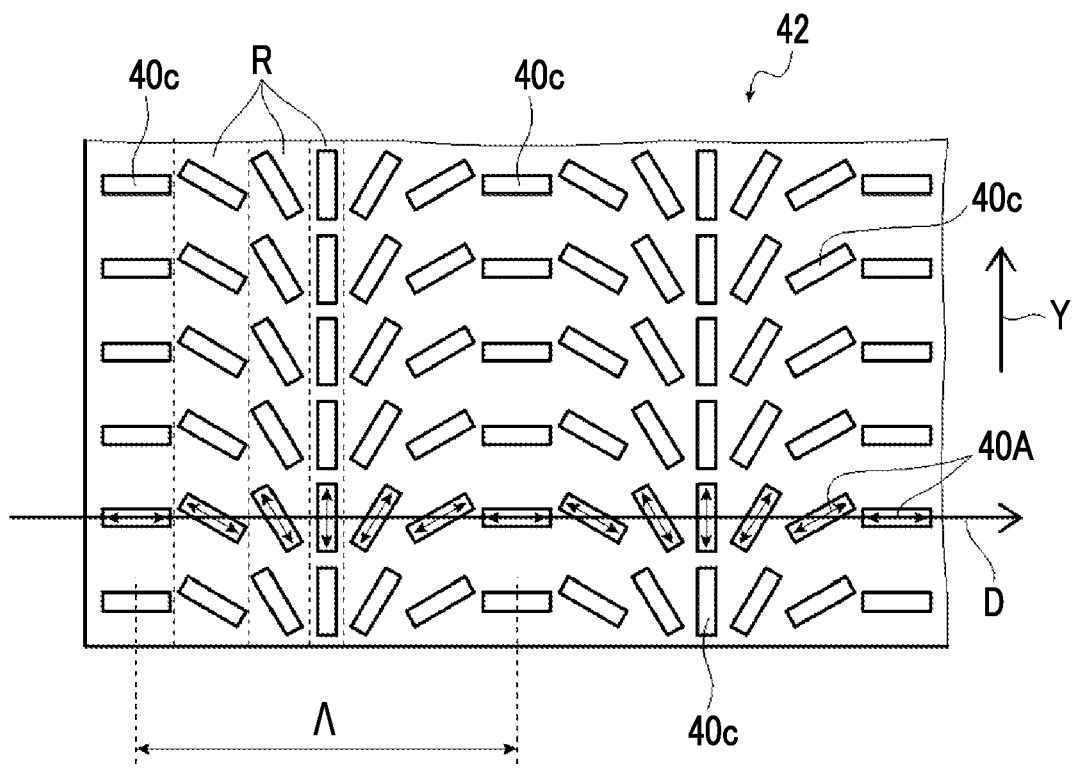
FIG. 5 is a front view showing the disk-like liquid crystal layer shown in FIG. 4.

In the example shown in FIGS. 4 and 5, the rod-like liquid crystal layer is formed by immobilizing a liquid crystal phase where a rod-like liquid crystal compound is aligned and has a liquid crystal alignment pattern where a direction in which a direction of an optical axis derived from the liquid crystal compound changes while continuously rotating is parallel to at least one in-plane direction.

In the example shown in FIG. 4, the rod-like liquid crystal layer 42 is laminated on an alignment film 32 that is laminated on a support 30.

In the first rod-like liquid crystal layer 42 from the bottom of the transmissive liquid crystal diffraction element 10 shown in FIG. 1, the rod-like liquid crystal layer 42 may be laminated on the support 30 and the alignment film 32. Alternatively, the rod-like liquid crystal layer 42 may be laminated, for example, in a state where only the alignment film 32 and the rod-like liquid crystal layer 42 are laminated after peeling off the support 30. Alternatively, the rod-like liquid crystal layer 42 may be laminated, for example, in a state where only the rod-like liquid crystal layer 42 is laminated after peeling off the support 30 and the alignment film 32.

In addition, the rod-like liquid crystal layer 42 may be directly formed and laminated on the disk-like liquid crystal layer 44 as in the third rod-like liquid crystal layer 42 from the bottom of the transmissive liquid crystal diffraction element 10 shown in FIG. 1, and the rod-like liquid crystal layer 42 may be formed on the support and subsequently laminated on the disk-like liquid crystal layer 44 after peeling off the support and the alignment film as in the example of FIG. 4.

<Support>

The support 30 supports the alignment film 32 and the rod-like liquid crystal layer 42.

As the support 30, various sheet-shaped materials (films or plate-shaped materials) can be used as long as they can support the alignment film 32 and the rod-like liquid crystal layer 42.

A transmittance of the support 30 with respect to light to be diffracted is preferably 50% or higher, more preferably 70% or higher, and still more preferably 85% or higher.

The thickness of the support 30 is not particularly limited and may be appropriately set depending on the use of the transmissive liquid crystal diffraction element, a material for forming the support 30, and the like in a range where the alignment film 32 and the rod-like liquid crystal layer 42 can be supported.

The thickness of the support 30 is preferably 1 to 1000 μm, more preferably 3 to 250 μm, and still more preferably 5 to 150 μm.

The support 30 may have a monolayer structure or a multi-layer structure.

In a case where the support 30 has a monolayer structure, examples thereof include supports formed of glass, triacetyl cellulose (TAC), polyethylene terephthalate (PET), polycarbonates, polyvinyl chloride, acryl, polyolefin, and the like. In a case where the support 30 has a multi-layer structure, examples thereof include a support including: one of the above-described supports having a monolayer structure that is provided as a substrate; and another layer that is provided on a surface of the substrate.

<Alignment Film>

The alignment film 32 is formed on the surface of the support 30. The alignment film 32 is an alignment film for aligning the rod-like liquid crystal compound 40c in a predetermined liquid crystal alignment pattern during the formation of the rod-like liquid crystal layer 42.

Although described below, in the present invention, the rod-like liquid crystal layer 42 has a liquid crystal alignment pattern in which a direction of an optical axis 40A (refer to FIG. 5) derived from the rod-like liquid crystal compound 40c changes while continuously rotating in one in-plane direction. Accordingly, the alignment film 32 is formed such that the rod-like liquid crystal layer 42 can form the liquid crystal alignment pattern.

In the following description, "the direction of the optical axis 40A rotates" will also be simply referred to as "the optical axis 40A rotates".

As the alignment film 32, various well-known films can be used.

Examples of the alignment film include a rubbed film formed of an organic compound such as a polymer, an obliquely deposited film formed of an inorganic compound, a film having a microgroove, and a film formed by lamination of Langmuir-Blodgett (LB) films formed with a Langmuir-Blodgett's method using an organic compound such as ω-tricosanoic acid, dioctadecylmethylammonium chloride, or methyl stearate.

The alignment film 32 formed by a rubbing treatment can be formed by rubbing a surface of a polymer layer with paper or fabric in a given direction multiple times.

As the material used for the alignment film 32, for example, a material for forming polyimide, polyvinyl alcohol, a polymer having a polymerizable group described in JP1997-152509A (JP-H9-152509A), or an alignment film 32 such as JP2005-97377A, JP2005-99228A, and JP2005-128503A is preferable.

The alignment film 32 can be suitably used as a so-called photo-alignment film obtained by irradiating a photo-alignment material with polarized light or non-polarized light. That is, a photo-alignment film that is formed by applying a photo-alignment material to the support 30 is suitably used as the alignment film 32.

The irradiation of polarized light can be performed in a direction perpendicular or oblique to the photo-alignment film, and the irradiation of non-polarized light can be performed in a direction oblique to the photo-alignment film.

Preferable examples of the photo-alignment material used in the alignment film that can be used in the present invention include: an azo compound described in JP2006-285197A, JP2007-76839A, JP2007-138138A, JP2007-94071A, JP2007-121721A, JP2007-140465A, JP2007-156439A, JP2007-133184A, JP2009-109831A, JP3883848B, and JP4151746B; an aromatic ester compound described in JP2002-229039A; a maleimide- and/or alkenyl-substituted nadiimide compound having a photo-alignable unit described in JP2002-265541A and JP2002-317013A; a photocrosslinking silane derivative described in JP4205195B and JP4205198B, a photocrosslinking polyimide, a photocrosslinking polyamide, or a photocrosslinking polyester described in JP2003-520878A, JP2004-529220A, and JP4162850B; and a photodimerizable compound, in particular, a cinnamate compound, a chalcone compound, or a coumarin compound described in JP1997-118717A (JP-H9-118717A), JP1998-506420A (JP-H10-506420A), JP2003-505561A, WO2010/150748A, JP2013-177561A, and JP2014-12823A.

Among these, an azo compound, a photocrosslinking polyimide, a photocrosslinking polyamide, a photocrosslinking polyester, a cinnamate compound, or a chalcone compound is suitably used.

The thickness of the alignment film 32 is not particularly limited. The thickness with which a required alignment function can be obtained may be appropriately set depending on the material for forming the alignment film 32.

The thickness of the alignment film 32 is preferably 0.01 to 5 μm and more preferably 0.05 to 2 μm.

A method of forming the alignment film 32 is not limited. Any one of various well-known methods corresponding to a material for forming the alignment film 32 can be used. For example, a method including: applying the alignment film 32 to a surface of the support 30; drying the applied alignment film 32; and exposing the alignment film 32 to laser light to form an alignment pattern can be used.

Figure 8:
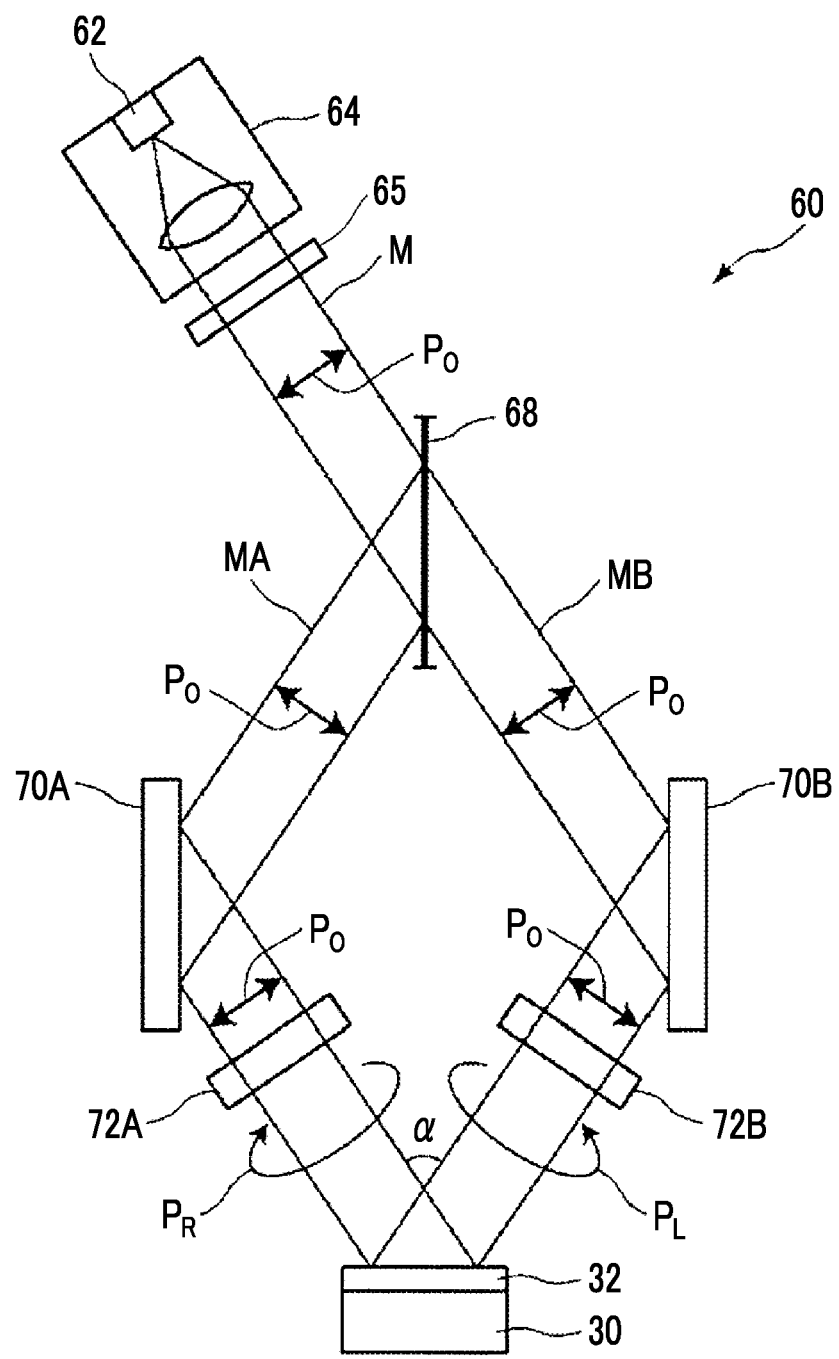
FIG. 8 is a conceptual diagram showing an action of the rod-like liquid crystal layer.

FIG. 8 conceptually shows an example of an exposure device that exposes the alignment film 32 to form an alignment pattern.

An exposure device 60 shown in FIG. 8 includes: a light source 64 including a laser 62; an λ2 plate 65 that changes a polarization direction of laser light M emitted from the laser 62; a polarization beam splitter 68 that splits the laser light M emitted from the laser 62 into two beams MA and MB; mirrors 70A and 70B that are disposed on optical paths of the split two beams MA and MB; and λ4 plates 72A and 72B.

The light source 64 emits linearly polarized light $P_O$. The λ4 plate 72A converts the linearly polarized light $P_O$ (beam MA) into right circularly polarized light $P_R$, and the λ4 plate 72B converts the linearly polarized light $P_O$ (beam MB) into left circularly polarized light $P_L$.

The support 30 including the alignment film 32 on which the alignment pattern is not yet formed is disposed at an exposed portion, the two beams MA and MB intersect and interfere with each other on the alignment film 32, and the alignment film 32 is irradiated with and exposed to the interference light.

Due to the interference in this case, the polarization state of light with which the alignment film 32 is irradiated periodically changes according to interference fringes. As a result, an alignment film (hereinafter, also referred to as "patterned alignment film") having an alignment pattern in which the alignment state changes periodically is obtained.

In the exposure device 60, by changing an intersecting angle a between the two beams MA and MB, the period of the alignment pattern can be adjusted. That is, by adjusting the intersecting angle a in the exposure device 60, in the alignment pattern in which the optical axis 40A derived from the rod-like liquid crystal compound 40c continuously rotates in the one in-plane direction, the length of the single period over which the optical axis 40A rotates by 180° in the one in-plane direction in which the optical axis 40A rotates can be adjusted.

By forming the optically-anisotropic layer on the alignment film 32 having the alignment pattern in which the alignment state periodically changes, as described below, the rod-like liquid crystal layer 42 having the liquid crystal alignment pattern in which the optical axis 40A derived from the rod-like liquid crystal compound 40c continuously rotates in the one in-plane direction can be formed.

In addition, by rotating the optical axes of the λ4 plates 72A and 72B by 90°, respectively, the rotation direction of the optical axis 40A can be reversed.

As described above, the patterned alignment film has the alignment pattern for aligning the liquid crystal compound to have the liquid crystal alignment pattern in which the direction of the optical axis of the liquid crystal compound in the rod-like liquid crystal layer formed on the patterned alignment film changes while continuously rotating in at least one in-plane direction. In a case where an axis in the direction in which the liquid crystal compound is aligned is an alignment axis, it can be said that the patterned alignment film has an alignment pattern in which the direction of the alignment axis changes while continuously rotating in at least one in-plane direction. The alignment axis of the patterned alignment film can be detected by measuring absorption anisotropy. For example, in a case where the amount of light transmitted through the patterned alignment film is measured by irradiating the patterned alignment film with linearly polarized light while rotating the patterned alignment film, it is observed that a direction in which the light amount is the maximum or the minimum gradually changes in the one in-plane direction.

In the present invention, the alignment film 32 is provided as a preferable aspect and is not an essential component.

For example, the following configuration can also be adopted, in which, by forming the alignment pattern on the support 30 using a method of rubbing the support 30, a method of processing the support 30 with laser light or the like, or the like, the rod-like liquid crystal layer 42 has the liquid crystal alignment pattern in which the direction of the optical axis 40A derived from the rod-like liquid crystal compound 40c changes while continuously rotating in at least one in-plane direction. That is, in the present invention, the support 30 may be made to act as the alignment film.

<Rod-Like Liquid Crystal Layer>

The rod-like liquid crystal layer 42 is formed on a surface of the alignment film 32.

As described above, the rod-like liquid crystal layer 42 is a liquid crystal layer obtained by immobilizing a liquid crystal phase where the rod-like liquid crystal compound 40c is aligned and has the liquid crystal alignment pattern in which the direction in which the direction of the optical axis derived from the liquid crystal compound changes while continuously rotating is parallel to at least one in-plane direction.

In the rod-like liquid crystal layer 42, as conceptually shown in FIG. 4, the rod-like liquid crystal compounds 40c may not be helically twisted and rotated in the thickness direction, and the rod-like liquid crystal compounds 40c at the same position in the plane direction may be aligned such that the directions of the optical axes 40A thereof are directed in the same direction.

<<Method of Forming Rod-Like Liquid Crystal Layer>>

The rod-like liquid crystal layer can be formed by immobilizing a liquid crystal phase in a layer shape, the liquid crystal phase having a liquid crystal alignment pattern in which a direction in which a direction of an optical axis derived from the liquid crystal compound changes while continuously rotating is parallel to at least one in-plane direction.

The structure in which a liquid crystal phase is immobilized may be a structure in which the alignment of the liquid crystal compound as a liquid crystal phase is maintained. Typically, the structure in which a liquid crystal phase is immobilized is preferably a structure which is obtained by aligning the polymerizable liquid crystal compound in the liquid crystal alignment pattern, polymerizing and curing the polymerizable liquid crystal compound with ultraviolet irradiation, heating, or the like to form a layer having no fluidity, and concurrently changing the state of the polymerizable liquid crystal compound into a state where the alignment state is not changed by an external field or an external force.

The structure in which a liquid crystal phase is immobilized is not particularly limited as long as the optical characteristics of the liquid crystal phase are maintained, and the liquid crystal compound in the rod-like liquid crystal layer does not necessarily exhibit liquid crystallinity. For example, the molecular weight of the polymerizable liquid crystal compound may be increased by a curing reaction such that the liquid crystallinity thereof is lost.

These points can also be applied to the disk-like liquid crystal layer described below.

Examples of a material used for forming the rod-like liquid crystal layer obtained by immobilizing a liquid crystal phase include a liquid crystal composition including a liquid crystal compound. It is preferable that the liquid crystal compound is a polymerizable liquid crystal compound.

In addition, the liquid crystal composition used for forming the rod-like liquid crystal layer may further include a surfactant and a polymerization initiator.

Polymerizable Liquid Crystal Compound

Examples of the rod-like polymerizable liquid crystal compound for forming the rod-like liquid crystal layer include a rod-like nematic liquid crystal compound. As the rod-like nematic liquid crystal compound, an azomethine compound, an azoxy compound, a cyanobiphenyl compound, a cyanophenyl ester compound, a benzoate compound, a phenyl cyclohexanecarboxylate compound, a cyanophenylcyclohexane compound, a cyano-substituted phenylpyrimidine compound, an alkoxy-substituted phenylpyrimidine compound, a phenyldioxane compound, a tolan compound, or an alkenylcyclohexylbenzonitrile compound is preferably used. Not only a low-molecular-weight liquid crystal compound but also a polymer liquid crystal compound can be used.

The polymerizable liquid crystal compound can be obtained by introducing a polymerizable group into the liquid crystal compound. Examples of the polymerizable group include an unsaturated polymerizable group, an epoxy group, and an aziridinyl group. Among these, an unsaturated polymerizable group is preferable, and an ethylenically unsaturated polymerizable group is more preferable. The polymerizable group can be introduced into the molecules of the liquid crystal compound using various methods. The number of polymerizable groups in the polymerizable liquid crystal compound is preferably 1 to 6 and more preferably 1 to 3.

Examples of the polymerizable liquid crystal compound include compounds described in Makromol. Chem. (1989), Vol. 190, p. 2255, Advanced Materials (1993), Vol. 5, p. 107, U.S. Pat. Nos. 4,683,327A, 5,622,648A, 5,770,107A, WO95/22586A, WO95/24455A, WO97/00600A, WO98/23580A, WO98/52905A, JP1989-272551A (JP-H1-272551A), JP1994-16616A (JP-H6-16616A), JP1995-110469A (JP-H7-110469A), JP1999-80081A (JP-H11-80081A), and JP2001-328973A. Two or more polymerizable liquid crystal compounds may be used in combination. In a case where two or more polymerizable liquid crystal compounds are used in combination, the orientation temperature can be decreased.

In addition, as a polymerizable liquid crystal compound other than the above-described examples, for example, a cyclic organopolysiloxane compound having a cholesteric phase described in JP1982-165480A (JP-S57-165480A) can be used. Further, as the above-described polymer liquid crystal compound, for example, a polymer in which a liquid crystal mesogenic group is introduced into a main chain, a side chain, or both a main chain and a side chain, a polymer cholesteric liquid crystal in which a cholesteryl group is introduced into a side chain, a liquid crystal polymer described in JP1997-133810A (JP-H9-133810A), and a liquid crystal polymer described in JP1999-293252A (JP-H11-293252A) can be used.

In addition, the addition amount of the polymerizable liquid crystal compound in the liquid crystal composition is preferably 75% to 99.9 mass %, more preferably 80% to 99 mass %, and still more preferably 85% to 90 mass % with respect to the solid content mass (mass excluding a solvent) of the liquid crystal composition.

Surfactant

The liquid crystal composition used for forming the rod-like liquid crystal layer may include a surfactant.

It is preferable that the surfactant is a compound that can function as an alignment control agent contributing to the stable or rapid alignment of the liquid crystal compound. Examples of the surfactant include a silicone-based surfactant and a fluorine-based surfactant. Among these, a fluorine-based surfactant is preferable.

Specific examples of the surfactant include compounds described in paragraphs "0082" to "0090" of JP2014-119605A, compounds described in paragraphs "0031" to "0034" of JP2012-203237A, exemplary compounds described in paragraphs "0092" and "0093" of JP2005-99248A, exemplary compounds described in paragraphs "0076" to "0078" and paragraphs "0082" to "0085" of JP2002-129162A, and fluorine (meth)acrylate polymers described in paragraphs "0018" to "0043" of JP2007-272185A.

As the surfactant, one kind may be used alone, or two or more kinds may be used in combination.

As the fluorine-based surfactant, a compound described in paragraphs "0082" to "0090" of JP2014-119605A is preferable.

The addition amount of the surfactant in the liquid crystal composition is preferably 0.01 to 10 mass %, more preferably 0.01 to 5 mass %, and still more preferably 0.02 to 1 mass % with respect to the total mass of the liquid crystal compound.

Polymerization Initiator In a case where the liquid crystal composition includes a polymerizable compound, it is preferable that the liquid crystal composition includes a polymerization initiator. In an aspect where a polymerization reaction progresses with ultraviolet irradiation, it is preferable that the polymerization initiator is a photopolymerization initiator which initiates a polymerization reaction with ultraviolet irradiation.

Examples of the photopolymerization initiator include an α-carbonyl compound (described in U.S. Pat. Nos. 2,367,661A, 2,367,670A), an acyloin ether (described in U.S. Pat. No. 2,448,828A), an α-hydrocarbon-substituted aromatic acyloin compound (described in U.S. Pat. No. 2,722,512A), a polynuclear quinone compound (described in U.S. Pat. Nos. 3,046,127A, 2,951,758A), a combination of a tri-arylimidazole dimer and p-aminophenyl ketone (described in U.S. Pat. No. 3,549,367A), an acridine compound and a phenazine compound (described in JP1985-105667A (JP-S60-105667A) and U.S. Pat. No. 4,239,850A), and an oxadiazole compound (described in U.S. Pat. No. 4,212,970A).

The content of the photopolymerization initiator in the liquid crystal composition is preferably 0.1 to 20 mass % and more preferably 0.5 to 12 mass % with respect to the content of the liquid crystal compound.

Crosslinking Agent

In order to improve the film hardness after curing and to improve durability, the liquid crystal composition may optionally include a crosslinking agent. As the crosslinking agent, a curing agent which can perform curing with ultraviolet light, heat, moisture, or the like can be suitably used.

The crosslinking agent is not particularly limited and can be appropriately selected depending on the purpose. Examples of the crosslinking agent include: a polyfunctional acrylate compound such as trimethylol propane tri(meth)acrylate or pentaerythritol tri(meth)acrylate; an epoxy compound such as glycidyl (meth)acrylate or ethylene glycol diglycidyl ether; an aziridine compound such as 2,2-bis hydroxymethyl butanol-tris[3-(1-aziridinyl)propionate] or 4,4-bis(ethyleneiminocarbonylamino)diphenylmethane; an isocyanate compound such as hexamethylene diisocyanate or a biuret type isocyanate; a polyoxazoline compound having an oxazoline group at a side chain thereof; and an alkoxysilane compound such as vinyl trimethoxysilane or N-(2-aminoethyl)-3-aminopropyltrimethoxysilane. In addition, depending on the reactivity of the crosslinking agent, a well-known catalyst can be used, and not only film hardness and durability but also productivity can be improved. Among these crosslinking agents, one kind may be used alone, or two or more kinds may be used in combination.

The content of the crosslinking agent is preferably 3% to 20 mass % and more preferably 5% to 15 mass % with respect to the solid content mass of the liquid crystal composition. In a case where the content of the crosslinking agent is in the above-described range, an effect of improving a crosslinking density can be easily obtained, and the stability of a liquid crystal phase is further improved.

Other Additives

Optionally, a polymerization inhibitor, an antioxidant, an ultraviolet absorber, a light stabilizer, a coloring material, metal oxide fine particles, or the like can be added to the liquid crystal composition in a range where optical performance and the like do not deteriorate.

In a case where the rod-like liquid crystal layer is formed, it is preferable that the liquid crystal composition is used as liquid.

The liquid crystal composition may include a solvent. The solvent is not particularly limited and can be appropriately selected depending on the purpose. An organic solvent is preferable.

The organic solvent is not particularly limited and can be appropriately selected depending on the purpose. Examples of the organic solvent include a ketone, an alkyl halide, an amide, a sulfoxide, a heterocyclic compound, a hydrocarbon, an ester, and an ether. Among these organic solvents, one kind may be used alone, or two or more kinds may be used in combination. Among these, a ketone is preferable in consideration of an environmental burden.

In a case where the rod-like liquid crystal layer is formed, it is preferable that the rod-like liquid crystal layer is formed by applying the liquid crystal composition to a surface where the rod-like liquid crystal layer is to be formed, forming a liquid crystal phase where the liquid crystal compound is aligned in the predetermined liquid crystal alignment pattern, and curing the liquid crystal compound.

That is, in a case where the rod-like liquid crystal layer is formed on the alignment film 32, it is preferable that the rod-like liquid crystal layer obtained by immobilizing a liquid crystal phase is formed by applying the liquid crystal composition to the alignment film 32, aligning the liquid crystal compound in the predetermined liquid crystal alignment pattern, and curing the liquid crystal compound. In addition, in a case where the rod-like liquid crystal layer is formed on the disk-like liquid crystal layer, it is preferable that the rod-like liquid crystal layer obtained by immobilizing a liquid crystal phase is formed by applying the liquid crystal composition to the disk-like liquid crystal layer, aligning the liquid crystal compound in the predetermined liquid crystal alignment pattern, and curing the liquid crystal compound.

For the application of the liquid crystal composition, a printing method such as ink jet or scroll printing or a well-known method such as spin coating, bar coating, or spray coating capable of uniformly applying liquid to a sheet-shaped material can be used.

The applied liquid crystal composition is optionally dried and/or heated and then is cured to form the rod-like liquid crystal layer. In the drying and/or heating step, the liquid crystal compound in the liquid crystal composition only has to be aligned to obtain the predetermined liquid crystal alignment pattern. In the case of heating, the heating temperature is preferably 200° C. or lower and more preferably 130° C. or lower.

The aligned liquid crystal compound is optionally further polymerized. Regarding the polymerization, thermal polymerization or photopolymerization using light irradiation may be performed, and photopolymerization is preferable. Regarding the light irradiation, ultraviolet light is preferably used. The irradiation energy is preferably 20 mJ/cm$^2$ to 50 J/cm$^2$ and more preferably 50 to 1500 mJ/cm$^2$. In order to promote a photopolymerization reaction, light irradiation may be performed under heating conditions or in a nitrogen atmosphere. The wavelength of irradiated ultraviolet light is preferably 250 to 430 nm.

<<Liquid Crystal Alignment Pattern of Rod-Like Liquid Crystal Layer>>

As described above, the rod-like liquid crystal layer has the liquid crystal alignment pattern in which the direction of the optical axis 40A derived from the rod-like liquid crystal compound 40c changes while continuously rotating in the one in-plane direction in a plane of the optically-anisotropic layer.

The optical axis 40A derived from the rod-like liquid crystal compound 40c is an axis having the highest refractive index in the rod-like liquid crystal compound 40c, that is, a so-called slow axis. In the rod-like liquid crystal compound 40c, the optical axis 40A is parallel to a rod-like major axis direction. In the following description, the optical axis 40A derived from the liquid crystal compound will also be referred to as "the optical axis 40A of the liquid crystal compound" or "the optical axis 40A".

FIG. 5 conceptually shows a plan view of the rod-like liquid crystal layer 42.

The plan view is a view in a case where the rod-like liquid crystal layer is seen from the top in FIG. 4, that is, a view in a case where the rod-like liquid crystal layer is seen from the thickness direction (laminating direction of the respective layers (films)) of the transmissive liquid crystal diffraction element.

In addition, in order to clearly show the configuration of the rod-like liquid crystal layer, FIG. 5 shows only the rod-like liquid crystal compound 40c on the surface of the alignment film 32.

As shown in FIG. 5, on the surface of the alignment film 32, the rod-like liquid crystal compound 40c forming the rod-like liquid crystal layer 42 has the liquid crystal alignment pattern in which the direction of the optical axis 40A changes while continuously rotating in the predetermined one in-plane direction indicated by arrow D (hereinafter, referred to as the arrangement axis D) in a plane of the rod-like liquid crystal layer 42 according to the alignment pattern formed on the alignment film 32 as the lower layer. In the example shown in the drawing, the rod-like liquid crystal compound 40c has the liquid crystal alignment pattern in which the optical axis 40A of the rod-like liquid crystal compound 40c changes while continuously rotating clockwise in the arrangement axis D direction.

The rod-like liquid crystal compound 40c forming the rod-like liquid crystal layer 42 is two-dimensionally arranged in a direction perpendicular to the arrangement axis D and the one in-plane direction (arrangement axis D direction).

In the following description, the direction perpendicular to the arrangement axis D direction will be referred to as "Y direction" for convenience of description. That is, the arrow Y direction is a direction perpendicular to the one in-plane direction in which the direction of the optical axis 40A of the rod-like liquid crystal compound 40c changes while continuously rotating in a plane of the rod-like liquid crystal layer 42. Accordingly, in FIGS. 1 to 4 and FIG. 6 described below, the Y direction is a direction perpendicular to the paper plane.

Specifically, "the direction of the optical axis 40A of the rod-like liquid crystal compound 40c changes while continuously rotating in the arrangement axis D direction (the predetermined one in-plane direction)" represents that an angle between the optical axis 40A of the rod-like liquid crystal compound 40c, which is arranged in the arrangement axis D direction, and the arrangement axis D direction varies depending on positions in the arrangement axis D direction, and the angle between the optical axis 40A and the arrangement axis D direction sequentially changes from θ to θ+180° or θ−180° in the arrangement axis D direction.

A difference between the angles of the optical axes 40A of the rod-like liquid crystal compound 40c adjacent to each other in the arrangement axis D direction is preferably 45° or less, more preferably 15° or less, and still more preferably less than 15°.

In addition, in the present invention, the liquid crystal compound rotates in the direction in which an angle between the optical axes 40A of the rod-like liquid crystal compound 40c adjacent to each other in the arrangement axis D direction decreases. Accordingly, in the rod-like liquid crystal layer 42 shown in FIGS. 4 and 5, the optical axis 40A of the rod-like liquid crystal compound 40c rotates to the right (clockwise) in the direction indicated by the arrow of the arrangement axis D.

On the other hand, in the rod-like liquid crystal compound 40c forming the rod-like liquid crystal layer 42, the directions of the optical axes 40A are the same in the Y direction perpendicular to the arrangement axis D direction, that is, the Y direction perpendicular to the one in-plane direction in which the optical axis 40A continuously rotates.

In other words, in the rod-like liquid crystal compound 40c forming the rod-like liquid crystal layer 42, angles between the optical axes 40A of the rod-like liquid crystal compounds 40c and the arrangement axis D direction are the same in the Y direction.

In the liquid crystal compounds arranged in the Y direction in the rod-like liquid crystal layer 42, the angles between the optical axes 40A and the arrangement axis D direction (the one in-plane direction in which the direction of the optical axis of the rod-like liquid crystal compound 40c rotates) are the same. Regions where the rod-like liquid crystal compounds 40c in which the angles between the optical axes 40A and the arrangement axis D direction are the same are disposed in the Y direction will be referred to as "regions R".

In the rod-like liquid crystal layer 42, in the liquid crystal alignment pattern of the rod-like liquid crystal compound 40c, the length (distance) over which the optical axis 40A of the rod-like liquid crystal compound 40c rotates by 180° in the arrangement axis D direction in which the optical axis 40A changes while continuously rotating in a plane is the length Λ of the single period in the liquid crystal alignment pattern.

That is, a distance between centers of two rod-like liquid crystal compounds 40c in the arrangement axis D direction is the length Λ of the single period, the two liquid crystal compounds having the same angle in the arrangement axis D direction. Specifically, as shown in FIG. 5, a distance between centers in the arrangement axis D direction of two rod-like liquid crystal compounds 40c in which the arrangement axis D direction and the direction of the optical axis 40A match with each other is the length Λ of the single period. In the following description, the length Λ of the single period will also be referred to as "single period Λ".

In the liquid crystal alignment pattern of the rod-like liquid crystal layer 42, the single period A is repeated in the arrangement axis D direction, that is, in the one in-plane direction in which the direction of the optical axis 40A changes while continuously rotating.

In FIG. 4, the rod-like liquid crystal compounds 40c present at the same position in a plane are aligned in the thickness direction such that the optical axes 40A thereof face the same direction. As in the example shown in FIG. 2, in the rod-like liquid crystal layer 42b and the disk-like liquid crystal layer 44b that are alternately laminated, in a case where the longitudinal direction of the liquid crystal compound is twisted and aligned in the thickness direction, the optical axis 40A of the rod-like liquid crystal compound 40c in each of the layers is twisted and aligned in the thickness direction. This point can also be applied to the disk-like liquid crystal layer.

<Disk-Like Liquid Crystal Layer>

Hereinafter, the disk-like liquid crystal layer 44 will be described using FIGS. 6 and 7.

Figure 6:
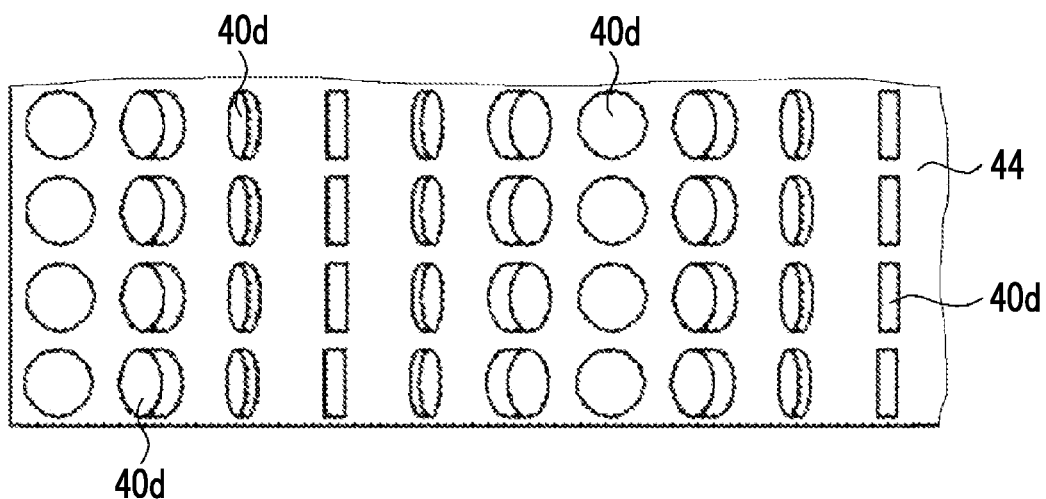
FIG. 6 is a conceptual diagram showing an example of an exposure device that exposes an alignment film.
Figure 7:
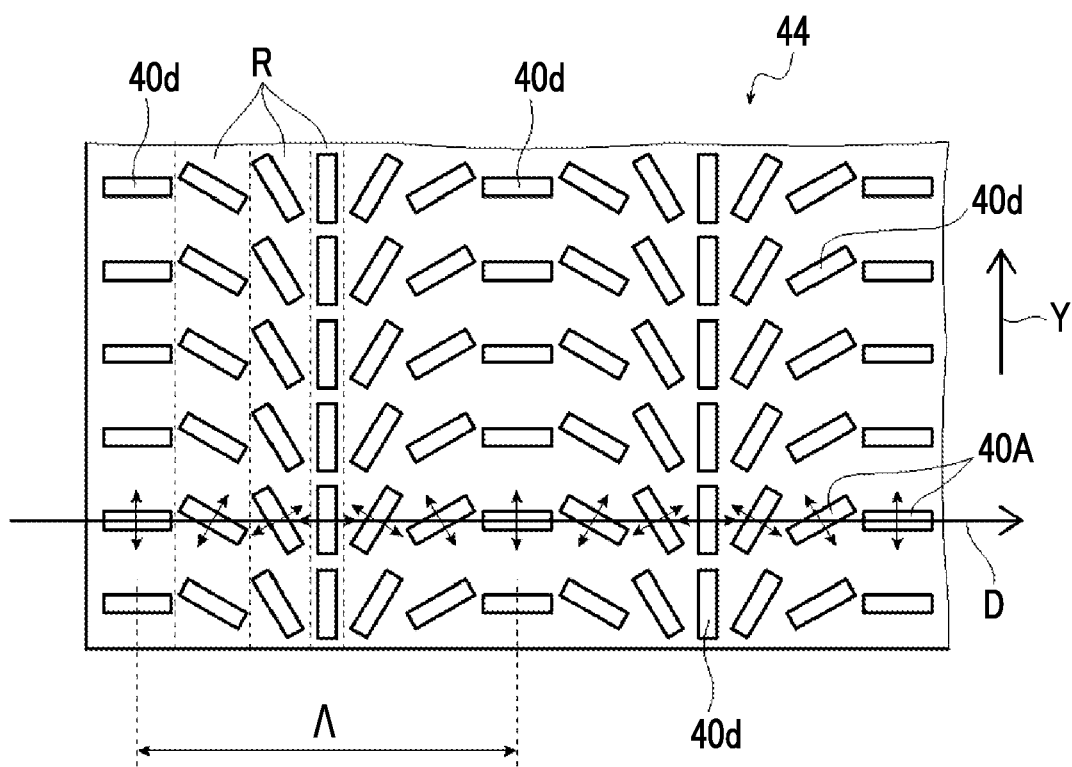
FIG. 7 is a conceptual diagram showing an action of the rod-like liquid crystal layer.

In the example shown in FIGS. 6 and 7, the disk-like liquid crystal layer is formed by immobilizing a liquid crystal phase where a disk-like liquid crystal compound is aligned and has a liquid crystal alignment pattern where a direction in which a direction of an optical axis derived from the liquid crystal compound changes while continuously rotating is parallel to at least one in-plane direction.

In a case where the disk-like liquid crystal layer 44 is laminated on the rod-like liquid crystal layer 42 as in the disk-like liquid crystal layer 44 of the transmissive liquid crystal diffraction element 10 shown in FIG. 1, the disk-like liquid crystal layer 44 may be directly formed and laminated on the rod-like liquid crystal layer 42, and the disk-like liquid crystal layer 44 may be formed on the support and subsequently laminated on the rod-like liquid crystal layer 42 after peeling off the support and the alignment film as in the rod-like liquid crystal layer 42 of FIG. 4.

As described above, the disk-like liquid crystal layer 44 is a liquid crystal layer obtained by immobilizing a liquid crystal phase where the disk-like liquid crystal compound 40d is aligned and has the liquid crystal alignment pattern in which the direction in which the direction of the optical axis derived from the liquid crystal compound changes while continuously rotating is parallel to at least one in-plane direction. The optical axis of the disk-like liquid crystal compound 40d faces a direction perpendicular to a disk plane. Therefore, in the disk-like liquid crystal layer 44, the disk-like liquid crystal compound 40d is arranged such that the disk plane is perpendicular to the interface (surface) of the disk-like liquid crystal layer 44.

In the disk-like liquid crystal layer 44, as conceptually shown in FIG. 6, the disk-like liquid crystal compounds 40d may not be helically twisted and rotated in the thickness direction, and the disk-like liquid crystal compounds 40d at the same position in the plane direction may be aligned such that the directions of the optical axes 40A thereof are directed in the same direction.

<<Method of Forming Disk-Like Liquid Crystal Layer>>

The disk-like liquid crystal layer can be formed by immobilizing a liquid crystal phase in a layer shape, the liquid crystal phase having a liquid crystal alignment pattern in which a direction in which a direction of an optical axis derived from the liquid crystal compound changes while continuously rotating is parallel to at least one in-plane direction.

Examples of a material used for forming the disk-like liquid crystal layer obtained by immobilizing a liquid crystal phase include a liquid crystal composition including a liquid crystal compound. It is preferable that the liquid crystal compound is a polymerizable liquid crystal compound.

In addition, as in the liquid crystal composition used for forming the rod-like liquid crystal layer, the liquid crystal composition used for forming the disk-like liquid crystal layer may further include additives such as a surfactant or a polymerization initiator and a solvent. The additives such as a surfactant or a polymerization initiator and the solvent are as described above.

Disk-Like Liquid Crystal Compound

As the disk-like liquid crystal compound, for example, compounds described in JP2007-108732A and JP2010-244038A can be preferably used.

In a case where the disk-like liquid crystal layer is formed, it is preferable that the disk-like liquid crystal layer is formed by applying the liquid crystal composition to a surface where the disk-like liquid crystal layer is to be formed, aligning the liquid crystal compound to a state the liquid crystal phase aligned in the predetermined liquid crystal alignment pattern, and curing the liquid crystal compound.

That is, in a case where the disk-like liquid crystal layer is formed on the alignment film, it is preferable that the disk-like liquid crystal layer obtained by immobilizing a liquid crystal phase is formed by applying the liquid crystal composition to the alignment film, aligning the liquid crystal compound in the predetermined liquid crystal alignment pattern, and curing the liquid crystal compound. In addition, in a case where the disk-like liquid crystal layer is formed on the rod-like liquid crystal layer, it is preferable that the disk-like liquid crystal layer obtained by immobilizing a liquid crystal phase is formed by applying the liquid crystal composition to the rod-like liquid crystal layer, aligning the liquid crystal compound in the predetermined liquid crystal alignment pattern, and curing the liquid crystal compound.

An application method, a drying and heating method after the application, and a polymerization method of the liquid crystal composition are as described above.

<<Liquid Crystal Alignment Pattern of Disk-Like Liquid Crystal Layer>>

As described above, the disk-like liquid crystal layer has the liquid crystal alignment pattern in which the direction of the optical axis 40A derived from the disk-like liquid crystal compound 40d changes while continuously rotating in the one in-plane direction in a plane of the optically-anisotropic layer.

The optical axis 40A derived from the disk-like liquid crystal compound 40d is an axis perpendicular to the disk plane of the disk-like liquid crystal compound 40d.

FIG. 7 conceptually shows a plan view of the disk-like liquid crystal layer 44.

The plan view is a view in a case where the disk-like liquid crystal layer is seen from the top in FIG. 6, that is, a view in a case where the disk-like liquid crystal layer is seen from the thickness direction (laminating direction of the respective layers (films)) of the transmissive liquid crystal diffraction element.

In addition, in order to clearly show the configuration of the disk-like liquid crystal layer, FIG. 7 shows only the disk-like liquid crystal compound 40d on the surface (interface) of the disk-like liquid crystal layer 44.

As shown in FIG. 7, the disk-like liquid crystal compound 40d forming the disk-like liquid crystal layer 44 has the liquid crystal alignment pattern in which the direction of the optical axis 40A changes while continuously rotating in one predetermined direction indicated by the arrangement axis D in a plane of the disk-like liquid crystal layer 44. In the example shown in the drawing, the disk-like liquid crystal compound 40d has the liquid crystal alignment pattern in which the optical axis 40A of the disk-like liquid crystal compound 40d changes while continuously rotating clockwise in the arrangement axis D direction.

The disk-like liquid crystal compound 40d forming the disk-like liquid crystal layer 44 is two-dimensionally arranged in the Y direction perpendicular to the arrangement axis D and the one in-plane direction (arrangement axis D direction).

In the liquid crystal compounds arranged in the Y direction in the disk-like liquid crystal layer 44, the angles between the optical axes 40A and the arrangement axis D direction are the same. Regions where the disk-like liquid crystal compounds 40d in which the angles between the optical axes 40A and the arrangement axis D direction are the same are disposed in the Y direction will be referred to as "regions R".

In the disk-like liquid crystal layer 44, in the liquid crystal alignment pattern of the disk-like liquid crystal compound 40d, the length (distance) over which the optical axis 40A of the disk-like liquid crystal compound 40d rotates by 180° in the arrangement axis D direction in which the optical axis 40A changes while continuously rotating in a plane is the length Λ of the single period in the liquid crystal alignment pattern.

That is, a distance between centers of two disk-like liquid crystal compounds 40d in the arrangement axis D direction is the length Λ of the single period, the two liquid crystal compounds having the same angle in the arrangement axis D direction. Specifically, as shown in FIG. 7, a distance between centers in the arrangement axis D direction of two disk-like liquid crystal compounds 40d in which the arrangement axis D direction and the direction of the optical axis 40A match with each other is the length Λ of the single period. In the following description, the length Λ of the single period will also be referred to as "single period Λ".

In the liquid crystal alignment pattern of the disk-like liquid crystal layer 44, the single period Λ is repeated in the arrangement axis D direction, that is, in the one in-plane direction in which the direction of the optical axis 40A changes while continuously rotating.

Here, as described above, at least at an interface between the rod-like liquid crystal layer 42 and the disk-like liquid crystal layer 44, regarding the rod-like liquid crystal compound 40c and the disk-like liquid crystal compound 40d present at the same position in the plane direction, a longitudinal direction of the rod-like liquid crystal compound 40c and a longitudinal direction of a shape obtained by projecting the disk-like liquid crystal compound 40d to the interface of the disk-like liquid crystal layer 44 match with each other. Therefore, as in the example shown in FIG. 1, in the rod-like liquid crystal layer 42b and the disk-like liquid crystal layer 44b that are alternately laminated, the rod-like liquid crystal compound 40c and the disk-like liquid crystal compound 40d present at the same position in the plane direction are aligned such that the longitudinal directions thereof face the same direction in the entire thickness direction.

In the transmissive liquid crystal diffraction element 10 where the rod-like liquid crystal layer 42 and the disk-like liquid crystal layer 44 are alternately laminated, it is preferable that an in-plane retardation (Re) value of each of the regions R is a half wavelength, that is, λ/2. The in-plane retardation is calculated from the product of a difference Δn in refractive index generated by refractive index anisotropy of the region R and the thickness of the transmissive liquid crystal diffraction element 10. Here, the difference in refractive index generated by refractive index anisotropy of the region R in the transmissive liquid crystal diffraction element 10 depends on a difference (difference in refractive index of the rod-like liquid crystal compound 40c) between the refractive index in the longitudinal direction of the rod-like liquid crystal compound 40c and the refractive index in a direction perpendicular to the longitudinal direction and a difference (difference in refractive index of the disk-like liquid crystal compound 40d) between the refractive index in the longitudinal direction of the disk-like liquid crystal compound 40d and the refractive index in a direction perpendicular to the longitudinal direction. Accordingly, the in-plane retardation in the region R of the transmissive liquid crystal diffraction element 10 is determined depending on the difference in refractive index of the rod-like liquid crystal compound 40c, the difference in refractive index of the disk-like liquid crystal compound 40d, the thickness of the rod-like liquid crystal compound 40c, the thickness of the disk-like liquid crystal compound 40d, and the like.

The transmissive liquid crystal diffraction element 10 has an action of refracting incident circularly polarized light and converting the polarization direction of the circularly polarized light.

Figure 9:
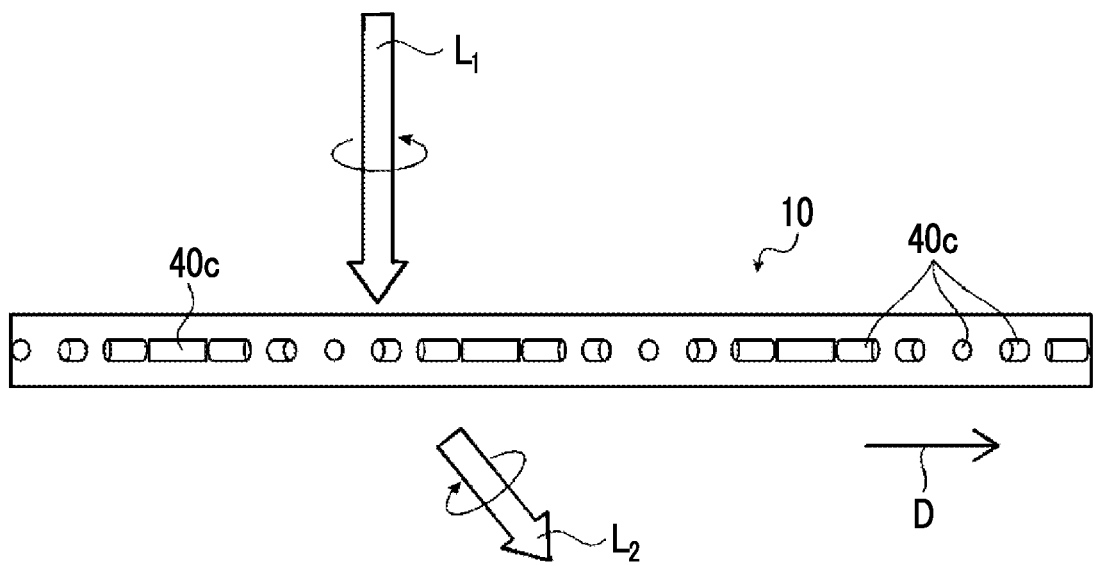
FIG. 9 is a diagram conceptually showing another example of the transmissive liquid crystal diffraction element according to the present invention.
Figure 10:
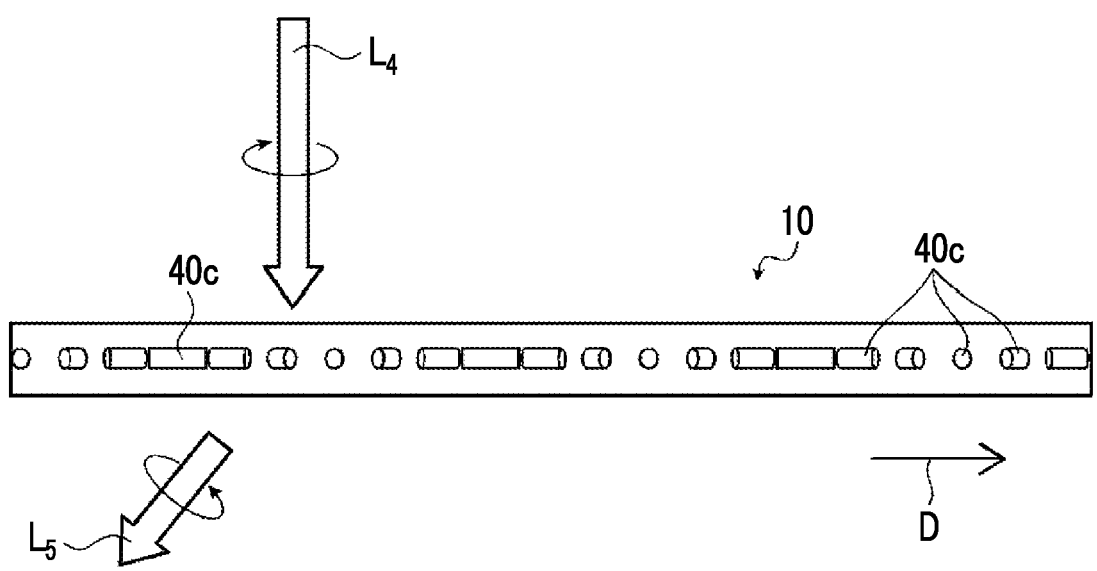
FIG. 10 is a diagram conceptually showing another example of the transmissive liquid crystal diffraction element according to the present invention.

The action of the transmissive liquid crystal diffraction element 10 will be described using the drawings conceptually shown in FIGS. 9 and 10. In the transmissive liquid crystal diffraction element 10, the value of the product of the difference in refractive index of the liquid crystal compound and the thickness of the transmissive liquid crystal diffraction element is λ/2. In addition, in order to show the rotation direction of the optical axis in the liquid crystal alignment pattern of the transmissive liquid crystal diffraction element 10, FIGS. 9 and 10 show only the rod-like liquid crystal compound 40c on the surface. The transmissive liquid crystal diffraction element 10 includes the rod-like liquid crystal layer 42 and the disk-like liquid crystal layer 44 that are alternately laminated as in the example shown in FIG. 1.

As shown in FIG. 9, in a case where the value of the product of the difference in refractive index of the liquid crystal compound of the transmissive liquid crystal diffraction element 10 and the thickness of the transmissive liquid crystal diffraction element 10 is λ/2 and incidence light $L_1$ as left circularly polarized light is incident into the transmissive liquid crystal diffraction element 10, the incidence light $L_1$ transmits through the transmissive liquid crystal diffraction element 10 to be imparted with a retardation of 180° such that the transmitted light $L_2$ is converted into right circularly polarized light.

In addition, the liquid crystal alignment pattern formed in the transmissive liquid crystal diffraction element 10 is a pattern that is periodic in the arrangement axis D direction. Therefore, the transmitted light $L_2$ travels in a direction different from a traveling direction of the incidence light $L_1$.

This way, the incidence light $L_1$ of the left circularly polarized light is converted into the transmitted light $L_2$ of right circularly polarized light that is tilted by a predetermined angle in the arrangement axis D direction with respect to an incidence direction. In the example shown in FIG. 9, the transmitted light $L_2$ is diffracted to travel in the lower right direction.

On the other hand, as shown in FIG. 10, in a case where the value of the product of the difference in refractive index of the liquid crystal compound of the transmissive liquid crystal diffraction element 10 and the thickness of the transmissive rod-like liquid crystal layer 42 is λ2 and incidence light $L_4$ as right circularly polarized light is incident into the transmissive liquid crystal diffraction element 10, the incidence light $L_4$ transmits through the transmissive liquid crystal diffraction element 10 to be imparted with a retardation of 180° such that the transmitted light $L_4$ is converted into transmitted light $L_5$ as left circularly polarized light.

In addition, the liquid crystal alignment pattern formed in the transmissive liquid crystal diffraction element 10 is a pattern that is periodic in the arrangement axis D direction. Therefore, the transmitted light $L_5$ travels in a direction different from a traveling direction of the incidence light $L_4$. In this case, the transmitted Light $L_5$ travels in a direction different from the transmitted light $L_2$, that is, in a direction opposite to the arrow direction of the arrangement axis D with respect to the incidence direction. This way, the incidence light $L_4$ is converted into the transmitted light $L_5$ of left circularly polarized light that is tilted by a predetermined angle in a direction opposite to the arrangement axis D direction with respect to an incidence direction. In the example shown in FIG. 10, the transmitted light $L_5$ is diffracted to travel in the lower left direction.

Here, refraction angles of the transmitted light components $L_2$ and $L_5$ can be adjusted depending on the length of the single period Λ of the liquid crystal alignment pattern formed in the transmissive liquid crystal diffraction element 10. Specifically, even in the transmissive liquid crystal diffraction element 10, as the single period Λ of the liquid crystal alignment pattern decreases, light components transmitted through the liquid crystal compounds adjacent to each other more strongly interfere with each other. Therefore, the transmitted light components $L_2$ and $L_5$ can be more largely refracted.

In addition, by reversing the rotation direction of the optical axis 40A of the liquid crystal compound that rotates in the arrangement axis D direction, the refraction direction of transmitted light can be reversed. That is, in the example FIGS. 9 and 10, the rotation direction of the optical axis 40A toward the arrangement axis D direction is clockwise. By setting this rotation direction to be counterclockwise, the refraction direction of transmitted light can be reversed. Specifically, in FIGS. 9 and 10, in a case where the rotation direction of the optical axis 40A toward the arrangement axis D direction is counterclockwise, left circularly polarized light incident into the transmissive liquid crystal diffraction element 10 from the upper side in the drawing transmits through the transmissive liquid crystal diffraction element 10 such that the transmitted light is converted into right circularly polarized light and is diffracted to travel in the lower left direction in the drawing. In addition, right circularly polarized light incident into the transmissive liquid crystal diffraction element 10 from the upper side in the drawing transmits through the transmissive liquid crystal diffraction element 10 such that the transmitted light is converted into left circularly polarized light and is diffracted to travel in the lower right direction in the drawing.

<<Method of Preparing Transmissive Liquid Crystal Diffraction Element>>

The transmissive liquid crystal diffraction element can be prepared by alternately forming the rod-like liquid crystal layer and the disk-like liquid crystal layer using the above-described method. That is, for example, first, the patterned alignment film is formed on the support, the liquid crystal composition for forming the rod-like liquid crystal layer is applied to the patterned alignment film, is dried and heated, and is cured to form a first rod-like liquid crystal layer. Next, the liquid crystal composition for forming the disk-like liquid crystal layer is applied to the first rod-like liquid crystal layer, is dried and heated, and is cured to form a first disk-like liquid crystal layer. Next, the liquid crystal composition for forming the rod-like liquid crystal layer is applied to the first disk-like liquid crystal layer, is dried and heated, and is cured to form a second rod-like liquid crystal layer. Next, the liquid crystal composition for forming the disk-like liquid crystal layer is applied to the second rod-like liquid crystal layer, is dried and heated, and is cured to form a second disk-like liquid crystal layer. As a result, the transmissive liquid crystal diffraction element where the two rod-like liquid crystal layers and the two disk-like liquid crystal layers are alternately formed can be prepared.

In the above-described example, the rod-like liquid crystal layer is formed on the patterned alignment film on the support. However, the present invention is not limited to this example. The disk-like liquid crystal layer may be formed on the patterned alignment film on the support, and subsequently the rod-like liquid crystal layer and the disk-like liquid crystal layer may be formed thereon.

In addition, after the preparation of the transmissive liquid crystal diffraction element, the support and the patterned alignment film may be peeled off.

Here, as described above, in order to allow the rod-like liquid crystal layer and the disk-like liquid crystal layer to have the configuration in which the liquid crystal compound is twisted and aligned in the thickness direction, the liquid crystal compositions for forming the rod-like liquid crystal layer and the disk-like liquid crystal layer may include a chiral agent.

Chiral Agent (Optically Active Compound)

The chiral agent has a function of causing a helical structure of a liquid crystal phase to be formed. The chiral agent may be selected depending on the purposes because a helical twisted direction and a helical twisting power (HTP) to be induced vary depending on compounds.

The chiral agent is not particularly limited, and a well-known compound (for example, Liquid Crystal Device Handbook (No. 142 Committee of Japan Society for the Promotion of Science, 1989), Chapter 3, Article 4-3, chiral agent for twisted nematic (TN) or super twisted nematic (STN), p. 199), isosorbide, or an isomannide derivative can be used.

In general, the chiral agent includes an asymmetric carbon atom. However, an axially asymmetric compound or a planar asymmetric compound not having an asymmetric carbon atom can also be used as the chiral agent. Examples of the axially asymmetric compound or the planar asymmetric compound include binaphthyl, helicene, paracyclophane, and derivatives thereof. The chiral agent may include a polymerizable group. In a case where both the chiral agent and the liquid crystal compound have a polymerizable group, a polymer which includes a repeating unit derived from the polymerizable liquid crystal compound and a repeating unit derived from the chiral agent can be formed due to a polymerization reaction of a polymerizable chiral agent and the polymerizable liquid crystal compound. In this aspect, it is preferable that the polymerizable group in the polymerizable chiral agent is the same as the polymerizable group in the polymerizable liquid crystal compound. Accordingly, the polymerizable group of the chiral agent is preferably an unsaturated polymerizable group, an epoxy group, or an aziridinyl group, more preferably an unsaturated polymerizable group, and still more preferably an ethylenically unsaturated polymerizable group.

In addition, the chiral agent may be a liquid crystal compound.

In a case where the chiral agent includes a photoisomerization group, a desired twisted alignment corresponding to a luminescence wavelength can be formed by irradiation of an actinic ray or the like through a photomask after coating and alignment, which is preferable. As the photoisomerization group, an isomerization portion of a photochromic compound, an azo group, an azoxy group, or a cinnamoyl group is preferable. Specific examples of the compound include compounds described in JP2002-80478A, JP2002-80851A, JP2002-179668A, JP2002-179669A, JP2002-179670A, JP2002-179681A, JP2002-179682A, JP2002-338575A, JP2002-338668A, JP2003-313189A, and JP2003-313292A.

The content of the chiral agent in the liquid crystal composition is preferably 0.01% to 200 mol % and more preferably 1% to 30 mol % with respect to the content molar amount of the liquid crystal compound.

Here, the transmissive liquid crystal diffraction element shown in FIG. 1 has the configuration in which the optical axis of the liquid crystal compound is parallel to the main surface of the optically-anisotropic layer, but the present invention is not limited thereto. In the transmissive liquid crystal diffraction element, the optical axis of the liquid crystal compound may be tilted to the main surface of the transmissive liquid crystal diffraction element.

In addition, the optical axes 40A of the liquid crystal compounds in the liquid crystal alignment patterns of the rod-like liquid crystal layer 42 shown in FIG. 5 and the disk-like liquid crystal layer 44 shown in FIG. 7 continuously rotate only in the arrangement axis D direction.

However, the present invention is not limited thereto, and various configurations can be used as long as the optical axes 40A of the liquid crystal compounds in the rod-like liquid crystal layer 42 and the disk-like liquid crystal layer 44 continuously rotate in the one in-plane direction.

Hereinabove, the transmissive liquid crystal diffraction element according to the embodiment of the present invention has been described in detail. However, the present invention is not limited to the above-described examples, and various improvements and modifications can be made within a range not departing from the scope of the present invention. Examples Hereinafter, the characteristics of the present invention will be described in detail using examples. Materials, chemicals, used amounts, material amounts, ratios, treatment details, treatment procedures, and the like shown in the following examples can be appropriately changed within a range not departing from the scope of the present invention. Accordingly, the scope of the present invention is not limited to the following specific examples.

Comparative Example 1

<Preparation of Liquid Crystal Diffraction Element>

A liquid crystal diffraction element including one rod-like liquid crystal layer was prepared as follows.

(Formation of Alignment Film)

A glass substrate was used as the support. The following coating liquid for forming an alignment film was applied to the support by spin coating. The support on which the coating film of the coating liquid for forming an alignment film was formed was dried using a hot plate at 60° C. for 60 seconds. As a result, an alignment film P-1 was formed.

Coating Liquid for Forming Alignment Film

The following material for photo-alignment 1.00 part by mass

Water 16.00 parts by mass

Butoxyethanol 42.00 parts by mass

Propylene glycol monomethyl ether 42.00 parts by mass

Material for Photo-Alignment

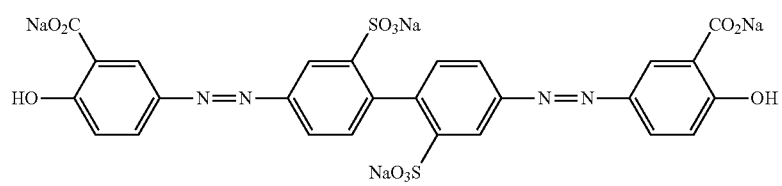

(Exposure of Alignment Film)

The alignment film P-1 was exposed using the exposure device shown in FIG. 8 to form an alignment film P-2 having an alignment pattern. In the exposure device, a laser that emits laser light having a wavelength (325 nm) was used as the laser. The exposure amount of the interference light was 300 mJ/cm$^2$. An intersecting angle (intersecting angle α) between the two laser beams was adjusted such that the single period Λ (the length over which the optical axis rotates by)180° of an alignment pattern formed by interference of the two laser beams was 1.05 μm.

(Formation of Rod-Like Liquid Crystal Layer)

As the liquid crystal composition forming the rod-like liquid crystal layer, the following composition B-1 was prepared.

Composition B-1

The following rod-like liquid crystal compound L-1 100.00 parts by mass

Polymerization initiator (IRGACURE (registered trade name) 907, manufactured by BASF SE) 3.00 parts by mass Photosensitizer (KAYACURE DETX-S, manufactured by Nippon Kayaku Co., Ltd.) 1.00 part by mass The following leveling agent T-1 0.08 parts by mass Methyl ethyl ketone 2000.00 parts by mass Rod-Like Liquid Crystal Compound L-1

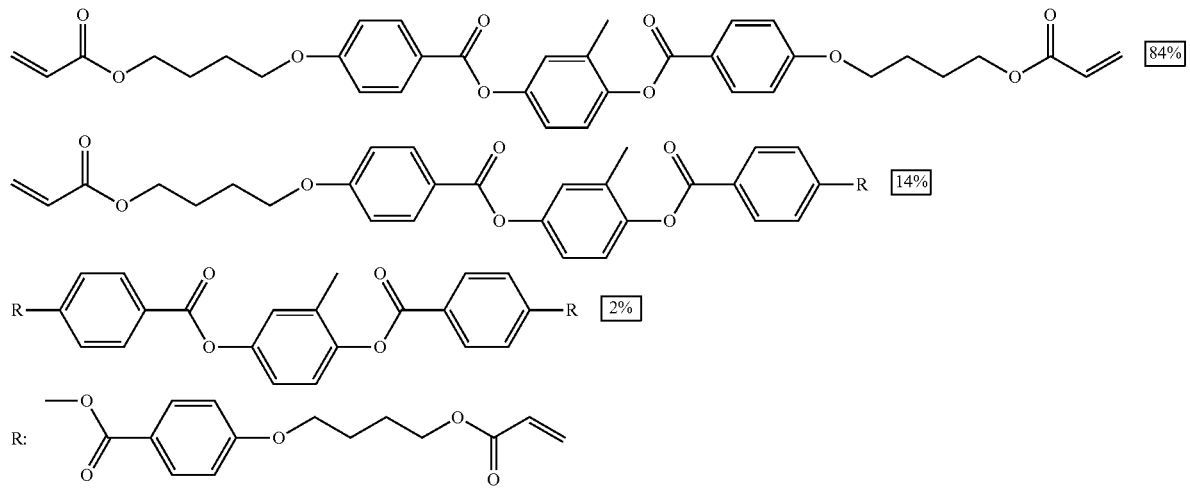

Leveling Agent T--1

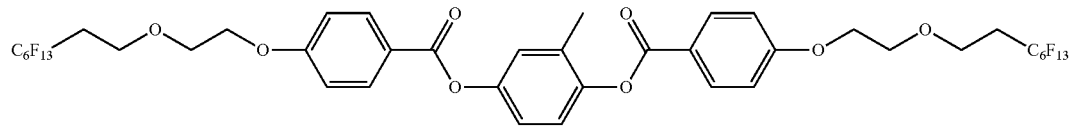

The rod-like liquid crystal layer was formed by applying multiple layers of the composition B-1 to the alignment film P-2. That is, first, the composition B-1 was applied to the alignment film P-2, was heated, and was cured with ultraviolet light to prepare the first liquid crystal immobilized layer. The second or subsequent liquid crystal immobilized layer was prepared using the same method as the preparation of the first liquid crystal immobilized layer, except that the composition B-1 was applied to the previously prepared liquid crystal immobilized layer.

More specifically, in order to prepare the first liquid crystal immobilized layer, the following composition B-1 was applied to the alignment film P-2 to form a coating film, the coating film was heated using a hot plate at 80° C., and the coating film was irradiated with ultraviolet light having a wavelength of 365 nm at an irradiation dose of 300 mJ/cm² using a high-pressure mercury lamp in a nitrogen atmosphere at 80° C. As a result, the alignment of the liquid crystal compound was immobilized.

In order to prepare the second or subsequent liquid crystal immobilized layer, the liquid crystal composition B-1 was applied to the previously prepared liquid crystal immobilized layer and then was heated, and cured with ultraviolet light under the above-described conditions. This way, by repeating the application of the composition B-1 until the total film thickness reached a desired thickness, and the rod-like liquid crystal layer was formed.

A difference An in refractive index of the cured layer of a liquid crystal composition B-1 was obtained by applying the liquid crystal composition B-1 a support with an alignment film for retardation measurement that was prepared separately, aligning the director of the liquid crystal compound to be parallel to the substrate, irradiating the liquid crystal compound with ultraviolet irradiation for immobilization to obtain a liquid crystal immobilized layer, and measuring the retardation Re(λ) and the film thickness of the liquid crystal immobilized layer. $\Delta n_\lambda$ can be calculated by dividing the retardation Re(λ) by the film thickness. The retardation Re(λ) was measured by measuring a desired wavelength using Axoscan (manufactured by Axometrix inc.) and measuring the film thickness using a SEM. In the expression of Re(λ),λ represents the wavelength of incidence light. In the following description, the wavelength λ of incidence light was 550 nm.

Finally, in the rod-like liquid crystal layer, $\Delta n_{1550} \times$ thickness of the liquid crystals was 720 nm, and it was verified with a polarization microscope that periodic alignment occurred. In addition, the twisted angle of the rod-like liquid crystal layer in the thickness direction was 0°. In addition, in a cross sectional image with a SEM, bright and dark lines that were perpendicular to the lower interface (interface with the glass substrate) of the rod-like liquid crystal layer was observed. The bright and dark lines were observed with the configuration where the liquid crystal compounds aligned in the same direction were laminated in the thickness direction.

Comparative Example 2

Using the same method as that of Comparative Example 1, the formation of the alignment film and the exposure of the alignment film were exposed, and subsequently a liquid crystal diffraction element including one disk-like liquid crystal layer and one rod-like liquid crystal layer was prepared as follows.

Composition D-0
The following disk-like liquid crystal compound L-2 80.00 parts by mass
The following disk-like liquid crystal compound L-3 20.00 parts by mass
Polymerization initiator (IRGACURE (registered trade name) 907, manufactured by BASF SE) 5.00 parts by mass
MEGAFACE F444 (manufactured by DIC Corporation) 0.50 parts by mass
Methyl ethyl ketone 300.00 parts by mass

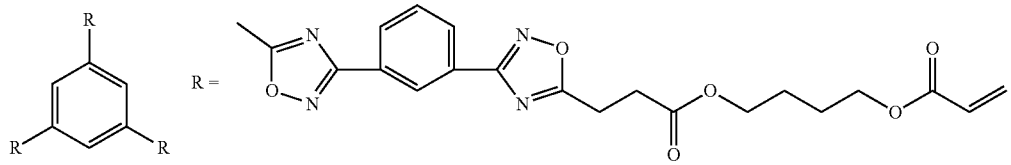

Disk-Like Liquid Crystal Compound L-2

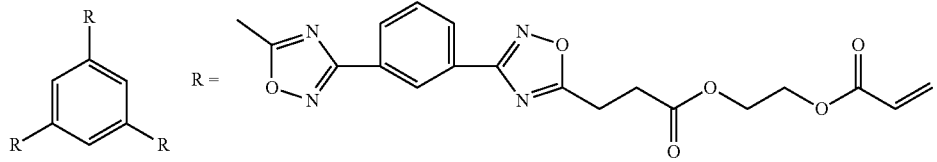

Disk-Like Liquid Crystal Compound L-3

(Formation of Disk-Like Liquid Crystal Layer)

The disk-like liquid crystal layer was formed by applying multiple layers of the composition D-0 to the alignment film P-2. That is, first, the composition D-0 was applied to the alignment film P-2, was heated, and was cured with ultraviolet light to prepare the first liquid crystal immobilized layer. The second or subsequent liquid crystal immobilized layer was prepared using the same method as the preparation of the first liquid crystal immobilized layer, except that the composition D-0 was applied to the previously prepared liquid crystal immobilized layer. The steps from the application to the ultraviolet curing are the same as those of Comparative Example 1. In this case, the coating thickness during each application was adjusted such that the thickness of a disk-like liquid crystal layer D-0 was about 0.4 μm and an excellent alignment state was obtained. As a result, $\Delta n_{1550} \times$ thickness of the disk-like liquid crystal layer D-0 was 360 nm.

(Formation of Rod-Like Liquid Crystal Layer)

A rod-like liquid crystal layer B-1 was formed on the formed disk-like liquid crystal layer using the same method as that of Comparative Example 1. $\Delta n_{1550} \times$ thickness of the rod-like liquid crystal layer B-1 was 360 nm.

As a result, a transmissive liquid crystal diffraction element ($\Delta n_{1550} \times$ thickness was 720 nm) having a structure where the disk-like liquid crystal layer D-0 and the rod-like liquid crystal layer B-1 were laminated was prepared. It was verified with a microscope that periodic alignment occurred. In addition, the twisted angle of the disk-like liquid crystal layer D-0 portion in the thickness direction was 0°, and the twisted angle of the rod-like liquid crystal layer B-1 portion in the thickness direction was 0°. In addition, in a cross sectional image with a SEM, bright and dark lines that were substantially perpendicular to the lower interface (interface with the glass substrate) of the disk-like liquid crystal layer D-0 was observed. In addition, the highest |Rth| of the disk-like liquid crystal layer and the rod-like liquid crystal layer was 180 nm.

Example 1

Using the same method as that of Comparative Example 1, the formation of the alignment film and the exposure of the alignment film were exposed, and subsequently a liquid crystal diffraction element including a plurality of disk-like liquid crystal layers and a plurality of rod-like liquid crystal layers were alternately laminated was prepared as follows.

(Formation of Disk-Like Liquid Crystal Layer and Rod-Like Liquid Crystal Layer)

First, the composition D-0 was applied to the alignment film, was heated, and was cured with ultraviolet light to form the liquid crystal immobilized layer (first disk-like liquid crystal layer D-0). Next, the composition B-1 was applied to the first disk-like liquid crystal layer D-0, was heated, and was cured with ultraviolet light to form the liquid crystal immobilized layer (second rod-like liquid crystal layer B-1). This way, by alternately repeating the formation of the disk-like liquid crystal layer D-0 and the rod-like liquid crystal layer B-1, 12 layers in total including six disk-like liquid crystal layers D-0 and six rod-like liquid crystal layers B-1 that were alternately laminated were formed. The steps from the application to the ultraviolet curing are the same as those of Comparative Example 1. In this case, the coating thickness per application was about 0.4 μm. Finally, $\Delta n_{1550} \times$ thickness of the liquid crystal layer was 720 nm.

This way, the liquid crystal diffraction element having a structure where the liquid crystal layer D-0 and the liquid crystal layer B-1 were alternately laminated was prepared. It was verified with a microscope that periodic alignment occurred. In addition, the twisted angle of the liquid crystal diffraction element in the thickness direction was 0°. In addition, in a cross sectional image with a SEM, bright and dark lines that were substantially perpendicular to the lower interface (interface with the glass substrate) of the first disk-like liquid crystal layer was observed. In addition, the highest |Rth| of the disk-like liquid crystal layer and the rod-like liquid crystal layer was 30 nm.

Example 2

A liquid crystal diffraction element according to Example 2 was prepared using the same method as that of Example 1, except that the composition D-0 and the composition B-1 were applied twice to form the respective layers.

That is, first, the composition D-0 was applied to the alignment film, was heated, and was cured with ultraviolet light to prepare the liquid crystal immobilized layer. The composition D-0 was applied to the liquid crystal immobilized layer, was heated, and was cured with ultraviolet light under the above-described conditions to form the first disk-like liquid crystal layer.

Next, the composition B-1 was applied to the first disk-like liquid crystal layer, was heated, and was cured with ultraviolet light to prepare the liquid crystal immobilized layer. The composition B-1 was applied to the liquid crystal immobilized layer, was heated, and was cured with ultraviolet light under the above-described conditions to form the first rod-like liquid crystal layer.

This way, by alternately repeating the application and the formation of the disk-like liquid crystal layer and the rod-like liquid crystal layer twice, the disk-like liquid crystal layer and the rod-like liquid crystal layer were alternately formed.

The coating thickness per application was about 0.4 µm. That is, the thickness of each of the disk-like liquid crystal layer and the rod-like liquid crystal layer was about 0.8 µm. Finally, $\Delta n_{1550} \times$ thickness of the liquid crystal layer was 720 nm.

This way, the liquid crystal diffraction element having a structure where the disk-like liquid crystal layer D-0 and the rod-like liquid crystal layer C-1 were alternately laminated was prepared. It was verified with a microscope that periodic alignment occurred. In addition, the twisted angle of the liquid crystal diffraction element in the thickness direction was 0°. In addition, in a cross sectional image with a SEM, bright and dark lines that were substantially perpendicular to the lower interface (interface with the glass substrate) of the first disk-like liquid crystal layer was observed. In addition, the highest |Rth| of the disk-like liquid crystal layer and the rod-like liquid crystal layer was 65 nm.

Example 3

Using the same method as that of Example 1, the formation of the alignment film and the exposure of the alignment film were exposed, and subsequently a liquid crystal diffraction element including a plurality of disk-like liquid crystal layers and a plurality of rod-like liquid crystal layers were alternately laminated was prepared as follows.

(Formation of Disk-Like Liquid Crystal Layer and Rod-Like Liquid Crystal Layer)

As the liquid crystal composition for forming the liquid crystal layer, the following compositions C-1, C-2, D-1, and D-2 were prepared. The reference numeral C represents a liquid crystal compound of which the major component was a rod-like compound, the reference numeral D represents a liquid crystal compound of which the major component was a disk-like compound, the reference numeral 1 represents clockwise (the twisted angle was a positive value), and the reference numeral 2 represents counterclockwise (the twisted angle was a negative value). That is, the composition C-1 is a clockwise liquid crystal composition of which the major component is a rod-like liquid crystal compound, the composition C-2 is a counterclockwise liquid crystal composition of which the major component is a rod-like liquid crystal compound, the composition D-1 is a clockwise liquid crystal composition of which the major component is a disk-like liquid crystal compound, and the composition D-2 is a counterclockwise liquid crystal composition of which the major component is a disk-like liquid crystal compound.

Composition C-1

| | |
|---|---|
| Rod-like liquid crystal compound L-1 | 100.00 parts by mass |
| Chiral agent Ch-2 | 0.058 parts by mass |
| Polymerization initiator (IRGACURE (registered trade name) 907, manufactured by BASF SE) | 3.00 parts by mass |
| Photosensitizer (KAYACURE DETX-S, manufactured by Nippon Kayaku Co., Ltd.) | 1.00 part by mass |
| Leveling agent T-1 | 0.08 parts by mass |
| Methyl ethyl ketone | 2000.00 parts by mass |

Composition C-2

| | |
|---|---|
| Rod-like liquid crystal compound L-1 | 100.00 parts by mass |
| Chiral agent Ch-3 | 0.099 parts by mass |
| Polymerization initiator (IRGACURE (registered trade name) 907, manufactured by BASF SE) | 3.00 parts by mass |
| Photosensitizer (KAYACURE DETX-S, manufactured by Nippon Kayaku Co., Ltd.) | 1.00 part by mass |
| Leveling agent T-1 | 0.08 parts by mass |
| Methyl ethyl ketone | 2000.00 parts by mass |

Composition D-1

| | |
|---|---|
| Disk-like liquid crystal compound L-2 | 80.00 parts by mass |
| Disk-like liquid crystal compound L-3 | 20.00 parts by mass |
| Polymerization initiator (IRGACURE (registered trade name) 907, manufactured by BASF SE) | 5.00 parts by mass |
| MEGAFACE F444 (manufactured by DIC Corporation) | 0.50 parts by mass |
| Chiral agent Ch-2 | 0.033 parts by mass |
| Methyl ethyl ketone | 300.00 parts by mass |

Composition D-2

| | |
|---|---|
| Disk-like liquid crystal compound L-2 | 80.00 parts by mass |
| Disk-like liquid crystal compound L-3 | 20.00 parts by mass |
| Polymerization initiator (IRGACURE (registered trade name) 907, manufactured by BASF SE) | 5.00 parts by mass |
| MEGAFACE F444 (manufactured by DIC Corporation) | 0.50 parts by mass |
| Chiral agent Ch-3 | 0.033 parts by mass |
| Methyl ethyl ketone | 300.00 parts by mass |

[0145] Disk-Like Liquid Crystal Compound L-2

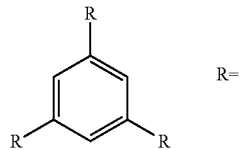

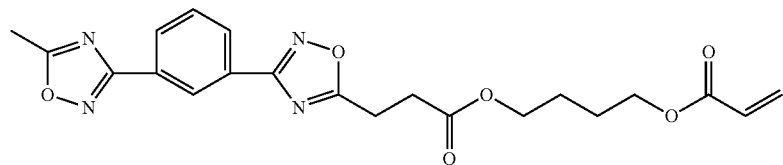

[0146] Disk-Like Liquid Crystal Compound L-3

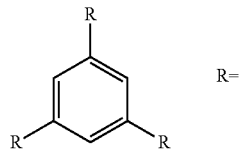

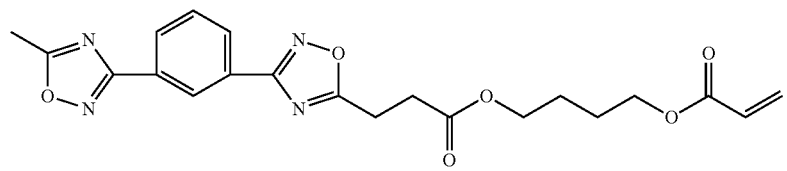

[0147] Chiral agent Ch-2

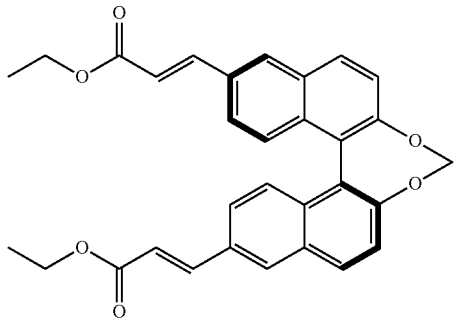

[0148] Chiral Agent Ch-3

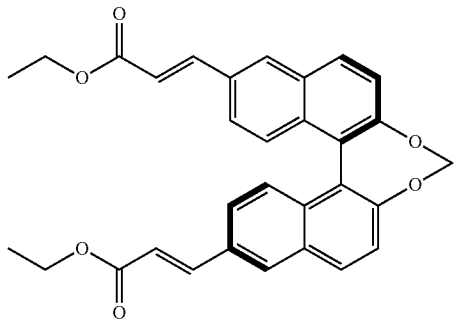

By alternately applying multiple layers of the composition C-1 and the composition D-1 to the alignment film and subsequently alternately applying multiple layers of the composition C-2 and the composition D-2 thereto, a liquid crystal layer was formed.

That is, first, the composition C-1 was applied to the alignment film, was heated, and was cured with ultraviolet light to prepare the rod-like liquid crystal layer C-1. The composition D-1 was applied to the rod-like liquid crystal layer C-1, was heated, and was cured with ultraviolet light under the above-described conditions to form the disk-like liquid crystal layer D-1. The formation of the rod-like liquid crystal layer C-1 and the disk-like liquid crystal layer D-1 was alternately repeated. The steps from the application to the ultraviolet curing are the same as those of Example 1. In this case, the coating thickness per application was about 0.4 μm. In addition, $\Delta n_{1550}$×thickness of the liquid crystal layer was 930 nm. In this case, $\Delta n_{1550}$ represents an in-plane direction birefringence index.

The alignment direction (the direction of the major axis of the rod-like liquid crystal compound) of the liquid crystal compound in the rod-like liquid crystal layer C-1 and the alignment direction (the direction of the long side of the disk-like liquid crystal compound) of the liquid crystal compound in the disk-like liquid crystal layer D-1 were parallel during the lamination and application. Therefore, optical characteristics in which the thickness direction retardation was offset were obtained.

By alternately applying multiple layers of the composition C-2 and the composition D-2 using the same method as described above to the liquid crystal layer where the rod-like liquid crystal layer C-1 and the disk-like liquid crystal layer D-1 were alternately laminated, a liquid crystal layer where a plurality of rod-like liquid crystal layers C-2 and a plurality of disk-like liquid crystal layers D-2 were alternately laminated was formed. In this case, $\Delta n_{1550}$×thickness of the liquid crystal layer was 930 nm.

This way, a liquid crystal layer was prepared in which the liquid crystal layer where the rod-like liquid crystal layer C-2 and the disk-like liquid crystal layer D-2 were alternately laminated was laminated on the liquid crystal layer where the rod-like liquid crystal layer C-1 and the disk-like liquid crystal layer D-1 were alternately laminated. It was verified with a microscope that periodic alignment occurred. In addition, the twisted angle in the thickness direction of the liquid crystal layer portion where the rod-like liquid crystal layer C-1 and the disk-like liquid crystal layer D-1 were alternately laminated was 60°, and the twisted angle in the thickness direction of the liquid crystal layer portion where the rod-like liquid crystal layer C-2 and the disk-like liquid crystal layer D-2 were alternately laminated was −60°.

In addition, in a cross sectional image with a SEM, bright and dark lines having a V-shape that was horizontally laid to the lower interface (interface with the glass substrate) was observed. The bright and dark lines were observed with the configuration where the liquid crystal compounds aligned such that the twisted directions in the thickness direction were different in terms of the positive and negative relationship were laminated in the thickness direction. In addition, the highest |Rth| of the disk-like liquid crystal layer and the rod-like liquid crystal layer was 30 nm.

Example 4

A liquid crystal diffraction element according to Example 4 was prepared using the same method as that of Example 3, except that the compositions C-1, C-2, D-1, and D-2 were applied twice to form the respective layers. The coating thickness per application was about 0.4 μm. That is, the thickness of each of the disk-like liquid crystal layer and the rod-like liquid crystal layer was about 0.8 μm. This way, a liquid crystal layer was prepared in which the liquid crystal layer ($\Delta n_{1550}$×thickness was 930 nm) where the rod-like liquid crystal layer C-2 and the disk-like liquid crystal layer D-2 were alternately laminated was laminated on the liquid crystal layer ($\Delta n_{1550}$×thickness was 930 nm) where the rod-like liquid crystal layer C-1 and the disk-like liquid crystal layer D-1 were alternately laminated. It was verified with a microscope that periodic alignment occurred. In addition, the twisted angle in the thickness direction of the liquid crystal layer portion where the rod-like liquid crystal layer C-1 and the disk-like liquid crystal layer D-1 were alternately laminated was 60°, and the twisted angle in the thickness direction of the liquid crystal layer portion where the rod-like liquid crystal layer C-2 and the disk-like liquid crystal layer D-2 were alternately laminated was −60°. In addition, in a cross sectional image with a SEM, bright and dark lines having a V-shape that was horizontally laid to the lower interface (interface with the glass substrate) of the liquid crystal layer was observed. In addition, the highest |Rth| of the disk-like liquid crystal layer and the rod-like liquid crystal layer was 65 nm.

[Evaluation]

Laser light having a wavelength of 1550 nm was incident into the prepared transmissive liquid crystal diffraction element at an incidence angle θi from the normal direction of the main surface of the transmissive liquid crystal diffraction element such that the azimuthal angle was the direction (arrangement axis D direction) in which the optical axis derived from the liquid crystal compound changes while continuously rotating in the one in-plane direction. In the direction in which light was incident, an emission angle θo and an intensity (diffraction efficiency) of refracted light that was refracted in a direction opposite to the light incidence direction were measured using a power meter. As the laser light, right circularly polarized light was incident. The standards are as follows.

A: the intensity (diffraction efficiency) was 95% or more.
B: the intensity (diffraction efficiency) was 80% or more.
C: the intensity (diffraction efficiency) was 70% or more.
D: the intensity (diffraction efficiency) was 60% or more.
E: the intensity (diffraction efficiency) was less than 50%

In addition, the polarization degree maintaining properties of the diffracted light were evaluated based on the following standards.

A: the circular polarization degree of the diffracted light was 99% or more.
B: the circular polarization degree of the diffracted light was 98% or more.
C: the circular polarization degree of the diffracted light was 96% or more.
D: the circular polarization degree of the diffracted light was less than 96%.

The results are shown in Table 1 below.

TABLE 1

| | Highest \|Rth\| of Disk-Like Liquid Crystal Layer and Rod-Like Liquid Crystal Layer (nm) | θo (°) | Intensity of θo | Polarization Degree Maintaining Properties of θo |
|---|---|---|---|---|
| Comparative Example 1 | — | 47.6 | −47.6 A | D |
| | | 42.6 | −53 C | D |
| | | 52.6 | −43 C | D |
| Comparative Example 2 | 180 | 47.6 | −47.6 A | B |
| | | 42.6 | −53 B | C |
| | | 52.6 | −43 B | C |
| Example 1 | 30 | 47.6 | −47.6 A | A |
| | | 42.6 | −53 B | A |
| | | 52.6 | −43 B | A |
| Example 2 | 65 | 47.6 | −47.6 A | A |
| | | 42.6 | −53 B | B |
| | | 52.6 | −43 B | B |
| Example 3 | 30 | 47.6 | −47.6 A | A |
| | | 42.6 | −53 A | A |
| | | 52.6 | −43 A | A |

TABLE 1-continued

| | Highest \|Rth\| of Disk-Like Liquid Crystal Layer and Rod-Like Liquid Crystal Layer (nm) | θo (°) | Intensity of θo (°) | Polarization Degree Maintaining Properties of θo |
|---|---|---|---|---|
| Example 4 | 65 | 47.6 | −47.6 A | A |
| | | 42.6 | −53 A | B |
| | | 52.6 | −43 A | B |

It can be seen from Table 1 that, in Examples of the present invention, the diffraction efficiency with respect to obliquely incident light does not decrease. In addition, it can be seen that incidence light was able to be diffracted while maintaining the polarization state thereof.

As can be seen from the above results, the effects of the present invention are obvious.

EXPLANATION OF REFERENCES 10, 10b, 10c: transmissive liquid crystal diffraction element
30: support
32: alignment film
37b: first optically-anisotropic layer
37c: second optically-anisotropic layer
40c: rod-like liquid crystal compound
40d: disk-like liquid crystal compound
40A: optical axis
42, 42b: rod-like liquid crystal layer
44, 44b: disk-like liquid crystal layer
60: exposure device
62: laser
64: light source
65: λ/2 plate
68: polarization beam splitter
70A, 70B: mirror
72A, 72B: λ/4 plate
D: arrangement axis
R: region
A: single period
M: laser light
MA, MB: beam
$P_O$: linearly polarized light
$P_R$: right circularly polarized light
$P_L$: left circularly polarized light
α: angle
$L_1$, $L_2$, $L_4$, $L_5$: light

What is claimed is:

1. A transmissive liquid crystal diffraction element comprising:
    a rod-like liquid crystal layer where a rod-like liquid crystal compound is aligned and a disk-like liquid crystal layer where a disk-like liquid crystal compound is aligned that are alternately laminated,
    wherein the rod-like liquid crystal layer and the disk-like liquid crystal layer have liquid crystal alignment patterns where directions in which directions of optical axes derived from the rod-like liquid crystal compound and the disk-like liquid crystal compound change while continuously rotating are parallel to at least one in-plane directions of the rod-like liquid crystal layer and the disk-like liquid crystal layer, respectively,
    a rotation direction of the optical axis in the liquid crystal alignment pattern of the rod-like liquid crystal layer and a rotation direction of the optical axis in the liquid crystal alignment pattern of the disk-like liquid crystal layer are the same,
    in a case where a length over which the direction of the optical axis rotates by 180° in the plane is set as a single period, a single period of the liquid crystal alignment pattern of the rod-like liquid crystal layer and a single period of the liquid crystal alignment pattern of the disk-like liquid crystal layer are the same,
    a thickness direction retardation\|Rth\| of each of the rod-like liquid crystal layer and the disk-like liquid crystal layer is 65 nm or less, and
    at an interface between the rod-like liquid crystal layer and the disk-like liquid crystal layer, regarding the rod-like liquid crystal compound and the disk-like liquid crystal compound present at the same position in a plane direction of a main surface of the transmissive liquid crystal diffraction element, a longitudinal direction of the rod-like liquid crystal compound and a longitudinal direction of a shape obtained by projecting the disk-like liquid crystal compound to the interface of the disk-like liquid crystal layer match with each other.

2. The transmissive liquid crystal diffraction element according to claim 1,
    wherein regarding the rod-like liquid crystal compound and the disk-like liquid crystal compound present at the same position in the plane direction of the main surface of the transmissive liquid crystal diffraction element, the longitudinal direction of the rod-like liquid crystal compound and the longitudinal direction of the shape obtained by projecting the disk-like liquid crystal compound to the interface of the disk-like liquid crystal layer match with each other in a range from one surface to another surface of the transmissive liquid crystal diffraction element.

3. The transmissive liquid crystal diffraction element according to claim 1,
    wherein regarding the rod-like liquid crystal compound and the disk-like liquid crystal compound present at the same position in the plane direction of the main surface of the transmissive liquid crystal diffraction element, in the thickness direction of each of the rod-like liquid crystal layer and the disk-like liquid crystal layer, the longitudinal direction of the rod-like liquid crystal compound and the longitudinal direction of the shape obtained by projecting the disk-like liquid crystal compound to the interface of the disk-like liquid crystal layer are continuously twisted and aligned, and
    a twisted angle of the twisted alignment in a range from one surface to another surface of the transmissive liquid crystal diffraction element is less than 360°.

4. The transmissive liquid crystal diffraction element according to claim 1,
    wherein each of a thickness of the rod-like liquid crystal layer and a thickness of the disk-like liquid crystal layer is 0.9 μm or less.

5. The transmissive liquid crystal diffraction element according to claim 2,
    wherein each of a thickness of the rod-like liquid crystal layer and a thickness of the disk-like liquid crystal layer is 0.9 μm or less.

6. The transmissive liquid crystal diffraction element according to claim 3,
    wherein each of a thickness of the rod-like liquid crystal layer and a thickness of the disk-like liquid crystal layer is 0.9 μm or less.

* * * * *